United States Patent
Woodford

(10) Patent No.: US 8,651,481 B2
(45) Date of Patent: Feb. 18, 2014

(54) APPARATUS AND METHOD FOR DETECTING THE THICKNESS OF A SHEET DOCUMENT

(75) Inventor: Malcolm Woodford, Lee on Solent (GB)

(73) Assignee: De La Rue International Limited, Basingstoke (GB)

( * ) Notice: Subject to any disclaimer, the term of this patent is extended or adjusted under 35 U.S.C. 154(b) by 0 days.

(21) Appl. No.: 13/498,849

(22) PCT Filed: Oct. 1, 2009

(86) PCT No.: PCT/GB2009/002341
§ 371 (c)(1),
(2), (4) Date: Jun. 18, 2012

(87) PCT Pub. No.: WO2011/039494
PCT Pub. Date: Apr. 7, 2011

(65) Prior Publication Data
US 2012/0256371 A1    Oct. 11, 2012

(51) Int. Cl.
*B65H 7/12* (2006.01)

(52) U.S. Cl.
USPC ............... 271/262; 271/263; 271/265.04

(58) Field of Classification Search
USPC ............... 271/262, 263, 265.04; 73/159
See application file for complete search history.

(56) References Cited

U.S. PATENT DOCUMENTS

| 3,759,095 A | 9/1973 | Short, Jr. et al. |
| 4,068,385 A | 1/1978 | Mitzel |
| 4,811,594 A | 3/1989 | Dvorsky |
| 5,238,123 A * | 8/1993 | Tovini et al. ............ 209/556 |
| 5,655,668 A * | 8/1997 | Drenth ............... 209/603 |
| 8,028,990 B2 * | 10/2011 | Miyamoto ............ 271/265.04 |
| 2006/0055105 A1* | 3/2006 | Kawaguchi et al. ..... 271/265.04 |
| 2010/0117295 A1* | 5/2010 | Miyamoto ............ 271/265.04 |
| 2010/0301551 A1* | 12/2010 | Muranaka et al. ....... 271/265.04 |
| 2011/0309572 A1* | 12/2011 | Miyamoto ............ 271/265.04 |
| 2012/0326386 A1* | 12/2012 | Yokoyama et al. ...... 271/265.04 |

FOREIGN PATENT DOCUMENTS

| DE | 101 51 627 A1 | 7/2002 |
| DE | 103 45 064 A1 | 4/2005 |

(Continued)

OTHER PUBLICATIONS

Written Opinion of the International Searching Authority issued in Application No. PCT/GB2009/002341; Dated Dec. 23, 2009.

(Continued)

*Primary Examiner* — David H Bollinger
(74) *Attorney, Agent, or Firm* — Oliff PLC

(57) ABSTRACT

A sheet thickness detection apparatus is provided for detecting the thickness of a sheet document on a document transport path. The apparatus comprises: a first detector unit having a sheet document contact point adjacent the document transport path, the detector unit comprising a piezoelectric element, a first portion of the piezoelectric element being fixed relative to the document transport path, and the piezoelectric element being arranged such that contact between a sheet document and the sheet document contact point as a sheet document passes the detector unit along the document transport path causes flexing of a second portion of the piezoelectric element relative to its first portion; and a sensing circuit connected to the piezoelectric element for outputting an electric signal based on the charge generated by the piezoelectric element upon flexing, the outputted signal being related to the thickness of the sheet document. A corresponding method is also provided.

25 Claims, 16 Drawing Sheets

(56) References Cited

FOREIGN PATENT DOCUMENTS

| | | | |
|---|---|---|---|
| EP | 0 130 824 A2 | 1/1985 | |
| EP | 0429184 A1 * | 5/1991 | |
| GB | 1 328 158 A | 8/1973 | |
| WO | WO 02/066239 A1 | 8/2002 | |

OTHER PUBLICATIONS

International Search Report issued in Application No. PCT/GB2009/002341; Dated Dec. 23, 2009.

* cited by examiner

APPARATUS AND METHOD FOR DETECTING THE THICKNESS OF A SHEET DOCUMENT

This invention relates to techniques for detecting the thickness of a sheet document, encompassing both the sensing of a variation in document thickness as well as measurement of the thickness.

In many sheet processing industries, it is useful to detect the thickness, or changes in thickness, of a sheet document. For example, in the field of currency handling, sensing of the thickness of a banknote has many applications including: the detection of overlapping notes ("doubles detection"), in which detection of an apparent note thickness above a predetermined threshold is used to identify the presence of overlapping notes; tape detection, i.e. identification of foreign bodies adhered to banknotes, which may be indicative of fraudulent construction or that the note is no longer fit for reissue; and in authentication/denomination, where a thickness measured from a note may be compared with known values or ranges for genuine notes, to assist in ascertaining the document's type and/or authenticity. Similar applications are found in other sheet processing fields including printing, as well as the handling of other sheet documents such as forms, cards, cheques, certificates and the like.

Typical banknote thicknesses vary according to their construction but, as an example, the British £20 note has an average thickness in the region of 100 to 120 microns. Foreign bodies, such as adhesive tape, which may be adhered to the banknote, commonly have a thickness of the order of 40 microns. Highly sensitive thickness detection techniques must therefore be employed in order to detect thicknesses or changes in thicknesses at this level of magnitude.

One conventional thickness detection method that is used in currency processing involves the provision of two rollers arranged across the width of the banknote path and opposing one another so as to form a nip therebetween, through which a banknote is conveyed. One of the rollers is fixed whereas the other is mounted in such a manner so as to permit movement in the direction perpendicular to the plane of the document path. As the sheet document passes through the nip, the moveably mounted sensor roller is deflected so as to accommodate the thickness of the sheet document within the nip. Throughout, the sensor roller is urged towards the nip such that if the document thickness decreases, the sensor roller will return towards the reference roller. The movement of the sensor roller is sensed by a linear variable differential transformer (LVDT) detector which employs solenoidal coils arranged about a ferro-magnetic core which is arranged to move in conjunction with the sensor roller. Movement of the core relative to the solenoidal coils changes the mutual induction between the solenoidal coils, leading to changes in induced voltages, from which an amount of the sensor roller displacement, and hence a measure of the document thickness, can be deduced. In some implementations, one LDVT sensor may be provided at each end of the sensor roller so as to provide two displacement measurements or "channels". If the difference between the two channels exceeds a certain threshold, a variation in thickness across the document width can be inferred, which may be indicative of a folded note corner for example. The presence of foreign bodies such as tape adhered to the document is detected by identifying anomalous regions of increased thickness sitting above the 'note plateau' (a region defined between the leading and trailing edges of the note, excluding a section close to each edge to account for corner folds). Regions which exceed the thickness of the plateau by more than a certain threshold are identified as tape.

Another example of a thickness detection technique, generally used in doubles detection, is disclosed in EP-A-0130824. Again, this makes use of opposing roller pairs in which one roller is moveably mounted and its displacement is detected using a light sensor. In this example, two pairs of rollers are provided, making it possible to infer that a note is folded, or that only part of a note has been conveyed, if the signals from each roller pair are dissimilar.

In accordance with the present invention, an apparatus for detecting the thickness of a sheet document on a document transport path is provided, the apparatus comprising:

a first detector unit having a sheet document contact point adjacent the document transport path, the detector unit comprising a piezoelectric element, a first portion of the piezoelectric element being fixed relative to the document transport path, and the piezoelectric element being arranged such that contact between a sheet document and the sheet document contact point as a sheet document passes the detector unit along the document transport path causes flexing of a second portion of the piezoelectric element relative to its first portion; and a sensing circuit connected to the piezoelectric element for outputting an electric signal based on a charge generated by the piezoelectric element upon flexing, the outputted signal being related to the thickness of the sheet document.

The invention also provides a method for detecting the thickness of a sheet document on a document transport path, comprising:

conveying a sheet document along the document transport path past a first detector unit having a sheet document contact point adjacent the document transport path, the detector unit comprising a piezoelectric element, a first portion of the piezoelectric element being fixed relative to the document transport path, contact between the sheet document and the sheet document contact point causing flexing of a second portion of the piezoelectric element relative to its first portion; and outputting via a sensing circuit an electric signal based on a charge generated by the piezoelectric element upon flexing, the outputted signal being related to the thickness of the sheet document.

Piezoelectric materials generate a potential difference (i.e. a charge) in response to mechanical deformation. The present inventor has found that, by utilizing a piezoelectric element to detect the thickness of a sheet document in the manner described above, a number of benefits are achieved.

Firstly, one feature lacking in conventional systems such as those mentioned above is the possibility of resolving the obtained thickness measurements to locations in a direction perpendicular to the direction of document transport. In the LVDT technique described above, since each of the rollers crosses the whole width of the document path, when a change in thickness is detected, there is no way to determine its extent or location on the document. As such the technique is inherently limited, providing no way to distinguish between thickness variations due, for example, to folded corners (which may otherwise be fit for recirculation) and those due to the presence of tape or similar (which must be removed). The EP-A-0130824 technique again provides little in the way of lateral resolution. In both cases, the mechanical complexity of the sensor, its part count and the ensuing high cost mean that it is not feasible to provide a large number of sensors in any one machine: hence the full width of the note path must be monitored by as few sensors as possible, and lateral resolution is not achievable.

In contrast, the piezoelectric element presently disclosed provides a much simpler mechanical arrangement: the part count for the sensor itself is reduced to one, leading to a substantial reduction in manufacturing time and cost. As a result it becomes possible to provide each machine with a significantly greater number of sensors achieving high lateral resolution and, in turn, enhancing the ability of the apparatus to distinguish the thickness feature being observed. In addition, the use of a piezoelectric element is particularly well adapted for incorporation in a compact detector unit design, enabling thickness to be measured along a much narrower channel and one which may be positioned in close proximity to one or more other channels, as will be discussed further below. In essence, this is a result of the size and shape of the piezoelectric element being readily adaptable to fit the available space, whereas sensor devices such as those used in conventional systems do not have such flexibility.

Secondly, conventional systems of the sort discussed above suffer from an inherently slow response time, due to the inertia of the rollers and even of the LVDT or light sensor components themselves. This can lead to an unacceptable reduction in measurement accuracy since at high document transport speeds, the sensor is unable to follow the document profile. For example, at high speeds, a measurement roller will typically rise higher than the leading edge of the note and be slow to descend off the trailing edge. The speed of operation of the document processing machine is thereby limited. Piezoelectric elements, on the other hand, are intrinsically lightweight and, as such, the response time is significantly reduced when compared to a heavier sensor operating under an equivalent restoring force. The sensitivity of the technique has also been found to be more than adequate. An additional benefit is that, since the voltage developed across a piezoelectric element is proportional to the rate of change of its deformation (rather than to the magnitude of deformation), the system requires no baseline calibration for the absolute position of the sensor.

The detector unit can be configured in a variety of ways which enable the passing sheet document to cause flexing of the piezoelectric element via the sheet document contact point. In one preferred embodiment, the sheet document contact point is provided by the second portion of the piezoelectric element, the second portion of the piezoelectric element being arranged to be directly contacted by a sheet document in use. This keeps the number of moving parts, as well as their collective size and mass, at a minimum. Advantageously, the second portion of the piezoelectric element is urged towards the document transport path, preferably using intrinsic resilience of the piezoelectric element. This helps to damp oscillations and return the element to rest quickly.

In other preferred examples, the first detector unit further comprises an intermediary assembly having a contact surface which is movably mounted relative to the document transport path and which is arranged to be contacted by a sheet document in use so as to provide the sheet document contact point, the intermediary assembly being adapted to impart movement of the contact surface to the second portion of the piezoelectric element. The use of an intermediary assembly increases the robustness of the device since there is no direct contact between the sheet document and the piezoelectric element, and the mode of flexing can therefore be more readily controlled by configuration of the intermediary assembly. It also becomes possible to space the piezoelectric element itself away from the document transport path, if desired, for easy access and maintenance. The contact surface should be movable (at least) in the direction perpendicular to the plane of the sheet document at the nip between the contact surface and the reference surface. The piezoelectric element however can be arranged to flex in any convenient orientation.

In particularly preferred implementations, the intermediary assembly comprises a movably mounted contact member disposed between the document transport path and the piezoelectric element, a first region of the contact member adjacent the document transport path providing the contact surface and a second region of the contact member contacting the second portion of the piezoelectric element so as to transmit movement of the contact member thereto. Such arrangements provide near direct transmission of movement from the sheet document to the piezoelectric element thereby maintaining the efficiency of the device. Preferably, the contact member is pivotably mounted relative to the reference surface although many other configurations are possible.

Another suitable implementation is the intermediary assembly comprising a movably mounted contact member, a region of the contact member facing the reference surface providing the contact surface, and one or more link members mechanically coupled to the contact member, a region of one of the link members contacting the second portion of the piezoelectric element so as to transmit movement of the contact member via the one or more link members thereto. Such arrangements may be preferred where it is desired to position the piezoelectric element remotely, i.e. away from the sheet document contact point, for example not in line with the document transport path or even on the other side of the document transport path.

Preferably, the detection unit further comprises an urging device arranged to urge the contact surface towards the reference surface.

The intermediary assembly may transmit motion to the piezoelectric element in a number of ways. In a preferred implementation, the second portion of the piezoelectric element is coupled to the intermediary assembly. For example, this could be achieved by providing an urging element, such as a spring, arranged to act on the second portion of the piezoelectric element such that it maintains contact with the intermediary assembly. Alternatively the piezoelectric element may be engaged with the intermediary assembly.

In certain preferred embodiments, the detector unit opposes a fixed reference surface of the document transport path, sheet documents conveyed in use between the fixed reference surface and the sheet document contact point causing flexing of the piezoelectric element. The fixed reference surface could be provided, for example, by a guide plate, roller or other fixture of the transport path. In this configuration, preferably, the sheet document contact point is arranged to contact the reference surface in the absence of a sheet document. For example, where the apparatus is configured such that sheet documents contact the piezoelectric element directly, the second portion of the piezoelectric element rests against the reference surface in the absence of a sheet document. Likewise, where the sheet document contact point is provided by an intermediary assembly, the contact surface may rest against the reference surface. As such, when the sheet document is introduced into the nip between the detector unit and the reference surface, the second portion of the piezoelectric element is contacted by the sheet document and displaced in order to enable passage of the sheet document therethrough. The deformation of the piezoelectric element is therefore directly related to the whole thickness of the document. Preferably the contact point is urged against the reference surface to ensure that the piezoelectric element is quickly restored to its rest position.

Alternatively, the sheet document contact point could be spaced a fixed distance from the reference surface such that only documents having a certain minimum thickness will lead to flexing thereof. This can be used to detect/measure changes in thickness occurring above the threshold or, if the size of the spacing between the piezoelectric element and reference surface is known, the absolute thickness of the whole document can still be determined.

In other preferred implementations, the apparatus further comprises a second detector unit of the same form as the first detector unit defined above, the second detector unit being arranged on the opposite side of the document transport path from the first such that the sheet document contact point of the first detector unit opposes the sheet document contact point of the second detector unit, the document transport path passing therebetween, and the sensing circuit being additionally connected to the piezoelectric element of the second detector unit to thereby output one or more electric signals generated by the first and/or second piezoelectric elements.

By passing the sheet document between opposing detection units, variations in thickness encountered on both faces of the document can be detected with equal accuracy. In contrast, where document thickness is measured against a reference surface, should a local variation in thickness (such as the presence of tape) occur on the surface of the document facing the reference surface, the thickness profile detected by the apparatus will be modified by the document substrate itself and may not be representative of the actual thickness variation.

Preferably, the sheet document contact point of the first detector unit and the sheet document contact point of the second detector unit are arranged to contact one another in the absence of a sheet document. Advantageously, the two contact points are urged toward one another, meeting at the position of the document transport path. However, as in the case of embodiments making use of a reference surface, this is not essential and the two contact points may be configured to return to rest positions spaced from one another by a known amount.

In particularly preferred embodiments, the first and second piezoelectric elements are arranged to flex in opposite directions upon passage of a sheet document, and the sensing circuit is adapted to sum the electric signals generated by the piezoelectric element of the first detector unit and the piezoelectric element of the second detector unit. In this way, the summed output signal represents the net deflection of the two elements.

In its simplest form, the piezoelectric element(s) could solely comprise a body of piezoelectric material. In preferred embodiments, however, the or each piezoelectric element comprises at least one layer of piezoelectric material extending from the first portion of the element to the second, and preferably further comprises a protective cover layer disposed on at least part of the layer of piezoelectric material. This adds to the robustness of the apparatus and is particularly desirable where the piezoelectric element is arranged to be directly contacted by the sheet documents. In general, the protective cover may be arranged to cover only that portion of the element which will be impacted by a sheet document (or by an intermediary assembly), or it may extend over a greater extent of the element. The protective cover may have additional functions. For example, where a conductive material is used, the cover may double as an electrode for connecting the piezoelectric material to the sensing circuit. Additionally or alternatively, the cover may be formed of a resilient material and be arranged as a leaf spring for applying a restorative urging force to the element.

The piezoelectric element may take any form which enables the flexing thereof in response to passage of the sheet document. In a preferred implementation, the piezoelectric element is elongate, the first portion of the piezoelectric element including a first end of the element, and the second portion of the piezoelectric element including a second, distal, end of the element. Such configurations are preferred since the bending moment imparted to the piezoelectric element by the sheet document will be high, leading to increased deformation and a correspondingly high signal. However, any other portion of the piezoelectric element could be utilised, such as a centre or intermediate portion, if preferred.

Preferably, the piezoelectric element is arranged so as to undergo bending and/or twisting upon flexing caused by passage of a sheet document. The preferred nature of the flexing may depend on the type of piezoelectric material employed.

In preferred implementations, the piezoelectric element is planar, having a thickness dimension substantially less than at least one of its lateral dimensions. The use of a thin element of this sort also increases the amount of flexing that will occur for any given sheet document thickness or change in thickness.

In particularly preferred examples the piezoelectric element comprises a polymeric piezoelectric material, preferably piezoelectric polyvinylidene fluoride. This material has been found to be particularly suitable for the presently described application. However, any piezoelectric material could be used and in other preferred examples, the piezoelectric element comprises a ceramic piezoelectric material, preferably lead zirconate titanate (PZT).

The nature of the output signal will depend on the intended application. In some cases, it may be sufficient to output a signal which identifies the occurrence of a change in thickness, for example when the leading or trailing edge of the sheet document passes through the nip. In such cases, the signal output by the sensor circuit may correspond to a voltage or current generated by the piezoelectric element(s) on flexing. Since the voltage or current generated by a piezoelectric material is proportional to its rate of change of deformation (rather than to its absolute deformation) such a signal will show peaks corresponding to changes in document thickness encountered by the apparatus. This may be sufficient for many applications where the incidence or location of thickness variations is key, rather than the actual size of the variations, such as identifying the passage of an edge of a document, or of an article stuck to the document, such as a piece of tape. Conversely, if thickness variations are expected (e.g. the leading and trailing edges of a document), the apparatus can be used to measure lateral dimensions of the sheet document such as its length parallel to the direction of transport, or its speed of transport if the lateral dimension is also known.

However, in other cases it is desirable to obtain an absolute measurement of thickness and in such cases the sensing circuit preferably further comprises an integrator adapted to integrate the signal generated by the piezoelectric element over time, such that the signal outputted by the sensing circuit corresponds to a thickness of the sheet document. By integrating the signal from the piezoelectric element over time, the output signal will provide a measure of the actual thickness (or change in thickness) detected.

Integration may be carried out in a variety of ways. In a preferred example the integrator comprises an analogue integration circuit, preferably an integrating amplifier. In other preferred examples the integrator comprises an analogue to digital converter arranged to sample the signal generated by the piezoelectric element, and a processor adapted to compute the integral from the sampled signal.

The output signal can be used in a variety of ways as will be determined by the intended application. For example, where the output signal corresponds to a current or voltage generated by the piezoelectric element, the occurrence of a peak corresponding to a change in thickness could be used to trigger an alarm. Alternatively, a trace of the document thickness detected over time could be recorded. However, preferably, the apparatus further comprises a processor adapted to generate a thickness profile of the sheet document along a dimension parallel to the direction of passage, based on the outputted signal and knowledge of the speed at which the sheet document passes between the reference surface and the detector unit. Similarly, the method preferably further comprises generating a thickness profile of the sheet document along a dimension parallel to the direction of passage, based on the outputted signal and knowledge of the speed at which the sheet document passes between the reference surface and the detector unit. The generation of a thickness profile in this way provides data which can be directly correlated with positions on the sheet document itself. It should be noted that the thickness profile may illustrate the magnitude of the document thickness (or changes in the document thickness), using an integrated signal, or could alternatively identify positions at which there is a change in thickness, using the non-integrated signal.

The sheet document could be transported through the apparatus using any known means for document conveying, which may be external to the thickness detection apparatus. However, in preferred examples, the apparatus further comprises a transport assembly arranged to convey sheet documents between the reference surface and the detector unit through the apparatus.

In accordance with a further aspect of the present invention, a two dimensional sheet thickness detection assembly is provided, comprising a plurality of sheet thickness detection apparatus according as described above, the respective sheet document contact points being spaced laterally from one another, such that the outputted signal from each respective sensing circuit relates to the thickness of corresponding laterally spaced regions of a sheet document. In a corresponding method, the sheet document is conveyed past a plurality of first and/or second detection units spaced laterally from one another and being connected to a corresponding plurality of sensing circuits, the method further comprising outputting via respective sensing circuits electric signal generated by the piezoelectric elements upon flexing, the outputted signals being related to the thickness of corresponding laterally spaced regions of the sheet document. By "laterally spaced", it is meant spaced points within a plane parallel to that of the transport path.

By providing more than one thickness detection apparatus, a plurality of channels can be output, so providing information as to the document thickness in two dimensions. As described earlier, the apparatus is particularly well adapted for compact implementation leading to the possibility of a multitude of detection units closely spaced in order to achieve high spatial resolution. Each of the regions of the sheet document corresponding to the respective detection units is preferably narrow compared with the width of the note across its leading edge: the narrower each "channel", the greater the lateral resolution. Preferably, the plurality of sheet document contact points are laterally deployed spaced from one another in a direction substantially perpendicular to the direction of passage of the sheet document. Detection units may also be deployed spaced from one another in a direction parallel to the direction of the passage of the sheet document if desired.

In a preferred embodiment the assembly comprises a first array of sheet thickness detection apparatus extending across at least a portion of the sheet document path in a direction substantially perpendicular to the direction of passage of the sheet document. This configuration lends itself to detecting thickness across the first portion of the sheet document at high resolution.

Still preferably the plurality of detection units further comprises a second array of sheet thickness detection apparatus spaced from the first array in the direction of document transport and extending across at least a portion of the width of the sheet document path in a direction substantially perpendicular to the direction of passage of the sheet document, the second array being offset from the first array in the direction substantially perpendicular to the direction of passage of the sheet document. The second array of detection units can therefore be used to detect the thickness of at least a second portion of the sheet document and, in combination, the first and second arrays can be used to detect thickness across the whole width of the sheet document. More than two such arrays could be utilised if preferred. The arrays are preferably linear.

In particularly preferred examples, the first and second arrays of sheet thickness detection apparatus each extend over less than the full width of the sheet document path, and the assembly further comprises first and second document transport modules disposed in line with the respective array. By providing first and second transport modules (which may be driven or undriven and are configured to guide the documents along the transport path) in this way, the transport of the sheet document can be controlled at all points of its passage through the apparatus. In a particularly preferred implementation, detection units within each array are spaced from one another by a transport component such as a roller such that passage of the sheet document is tightly controlled adjacent each detection channel. The two arrays are preferably offset with respect to one another such that the transport components of one array align with detector units of the other.

In particularly preferred embodiments, the assembly further comprises a processor adapted to generate a two-dimensional spatial map of the thickness of at least a portion of a sheet document, based on at least some of the outputted signals, the relative positions of the corresponding detector units and knowledge of the speed at which the sheet document passes between the reference surface and the detector unit. The corresponding method preferably further comprises generating a two-dimensional spatial map of the thickness of at least a portion of a sheet document, based on at least some of the outputted signals, the relative positions of the corresponding detector units and knowledge of the speed at which the sheet document passes between the reference surface and the detector unit. The spatial map can be used to provide detailed information as to the thickness profile of a document, identifying for example the extent of any overlap with a second document or the position and size of any tape or other foreign body adhered to the document, as well as identifying the position of security features which may affect the local thickness of a document, such as security threads, holograms and the like.

In certain preferred examples, the processor may further be adapted to compare the output signal or generated 2-dimensional spatial map with at least one predetermined signal profile or map corresponding to a known sheet document, to thereby determine a level of similarity between the detected sheet document and the known sheet document. This can be used to achieve a level of discrimination and/or authenticity checking not previously achievable.

The invention further provides a sheet document handling apparatus comprising an input module for feeding sheet documents into the apparatus, a document transport assembly for conveying sheet documents along a document transport path from the input module to an output module, and a sheet thickness detection apparatus or a two dimensional sheet thickness detection assembly (each as described above) arranged to detect the thickness of sheet documents on the document transport path.

Examples of apparatus for detecting thickness of sheet documents and methods thereof will now be described with reference to the accompanying drawings, in which.

Figure 3:
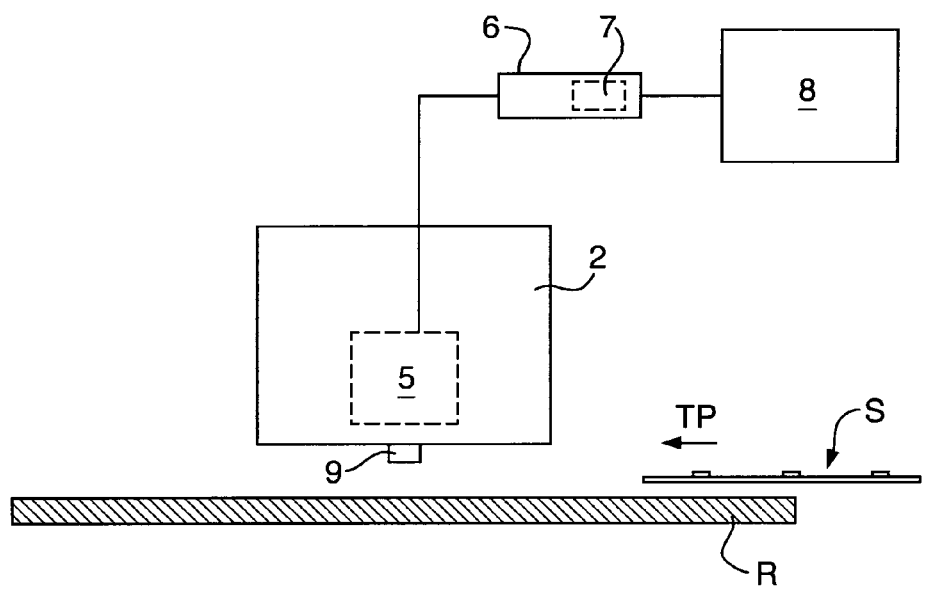
Figure 4:
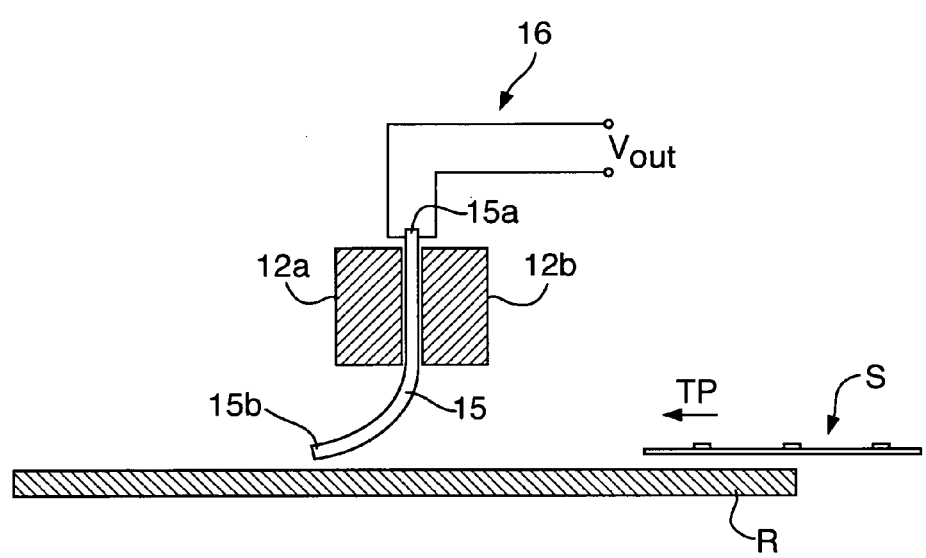
Figure 4A:
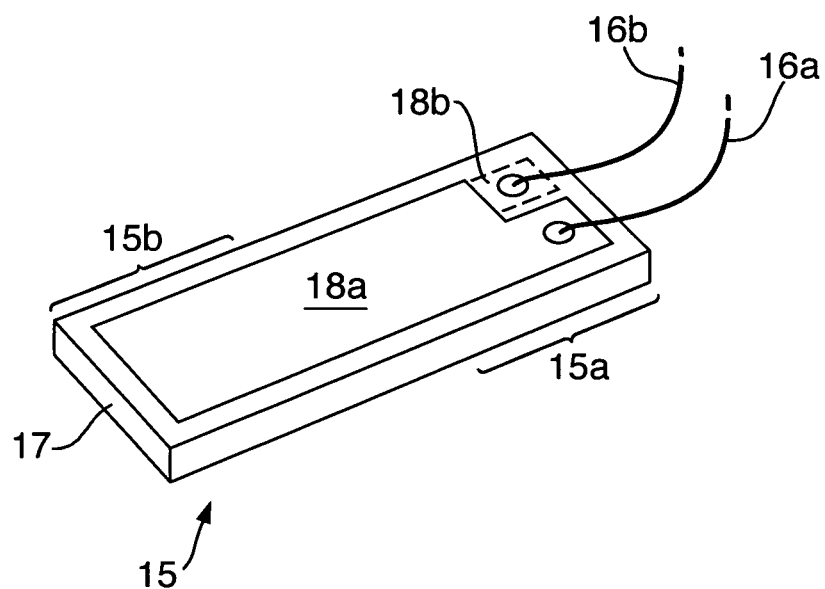
Figure 4B:
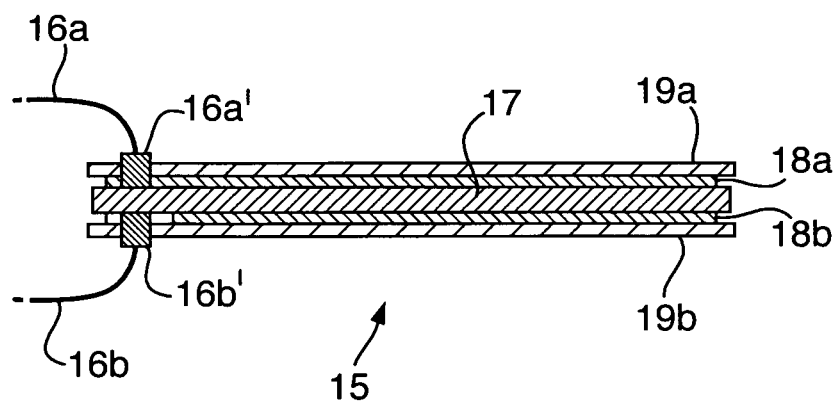
Figure 5A:
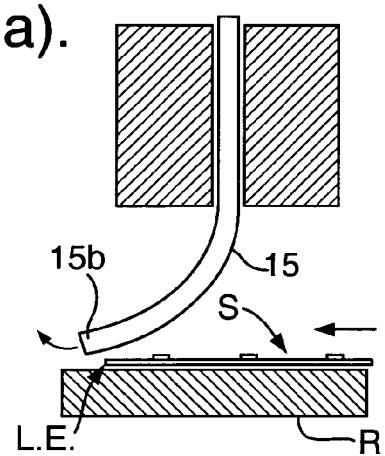
Figure 5A:
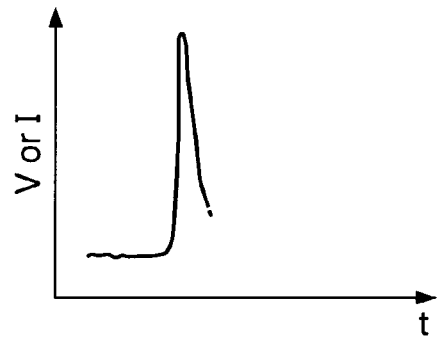
Figure 5B:
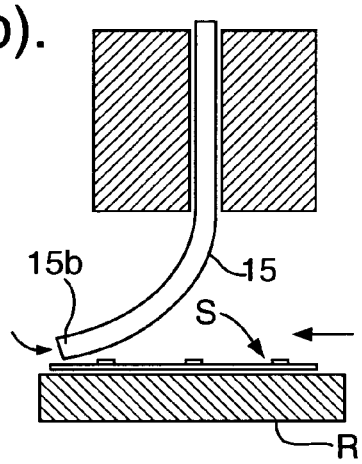
Figure 5B:
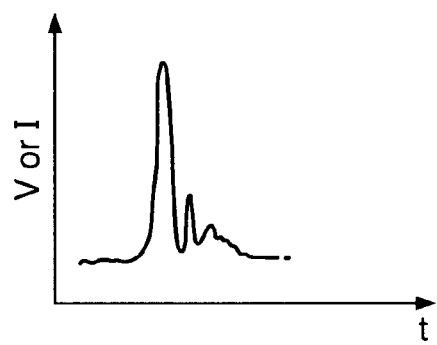
Figure 5C:
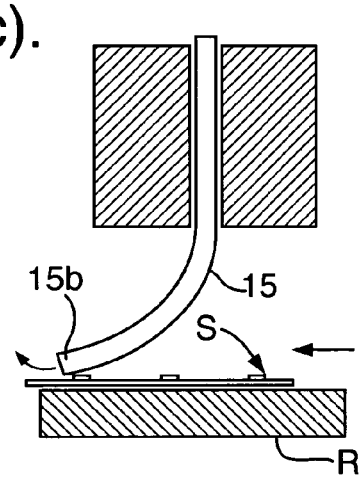
Figure 5C:
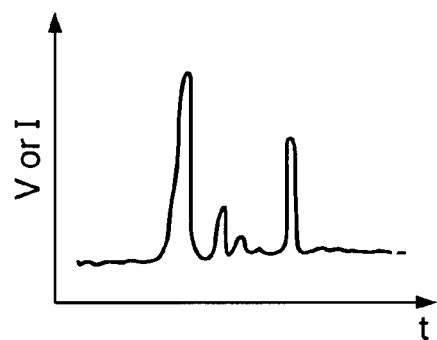
Figure 6:
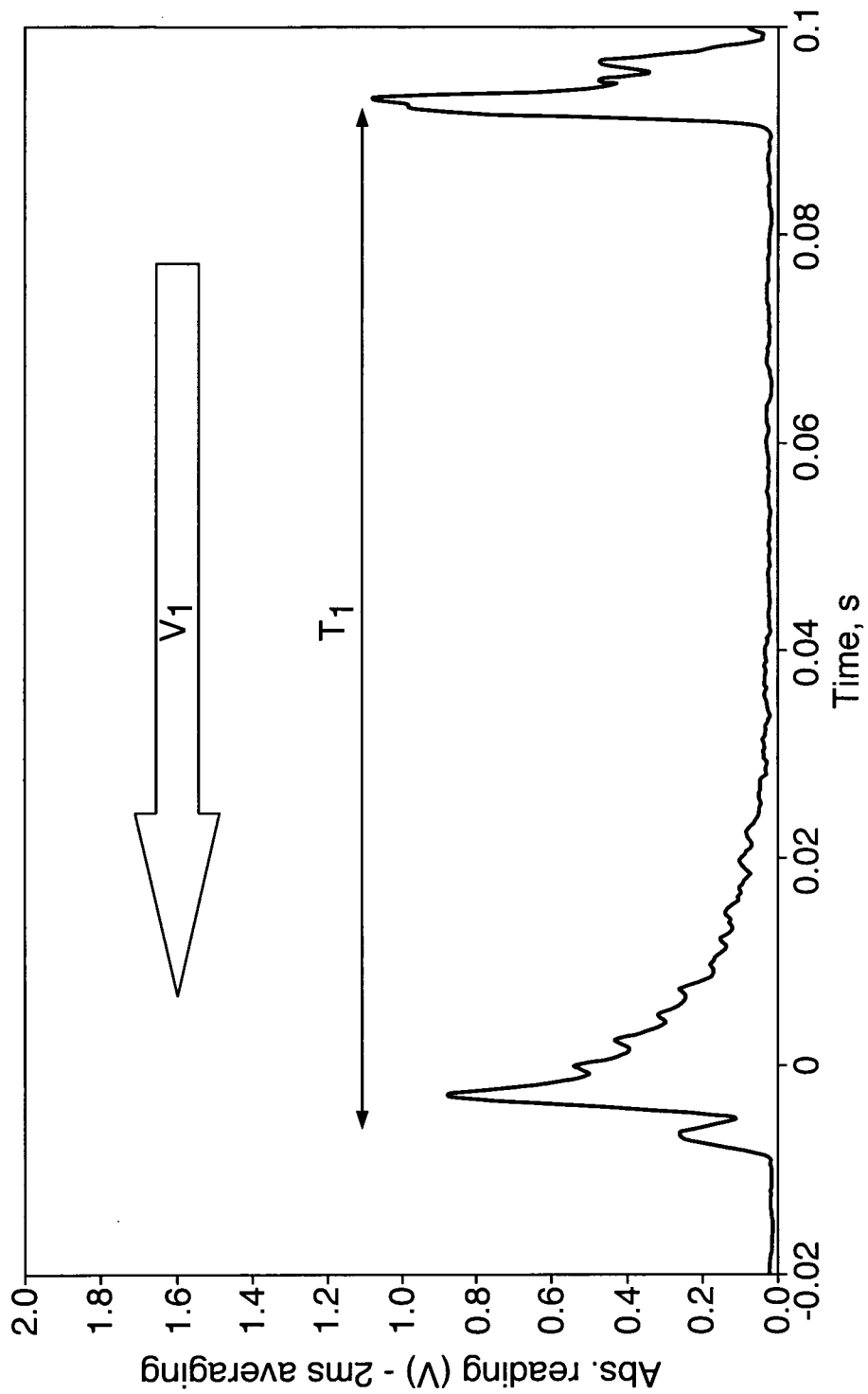
Figure 7:
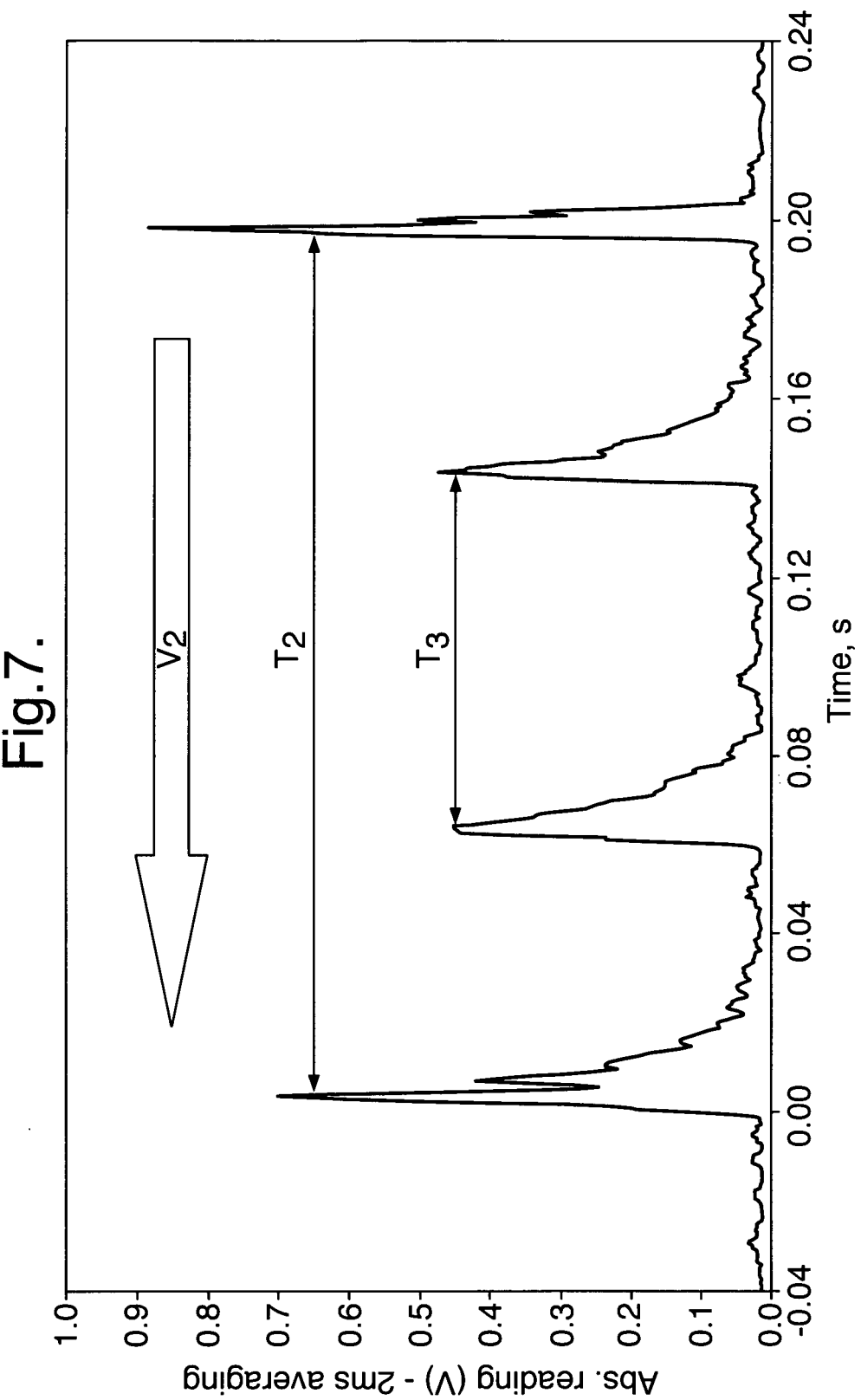
Figure 8:
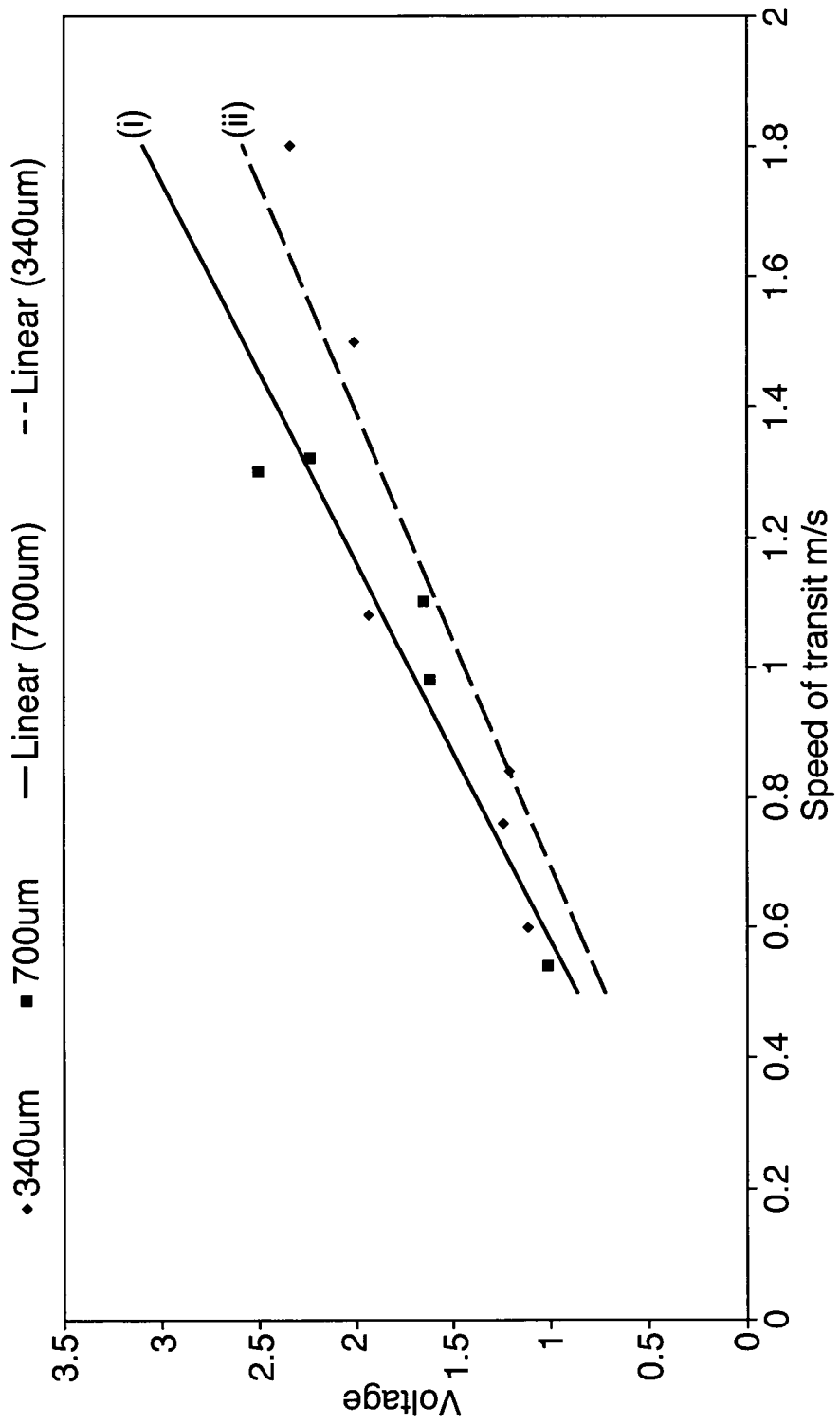
Figure 9:
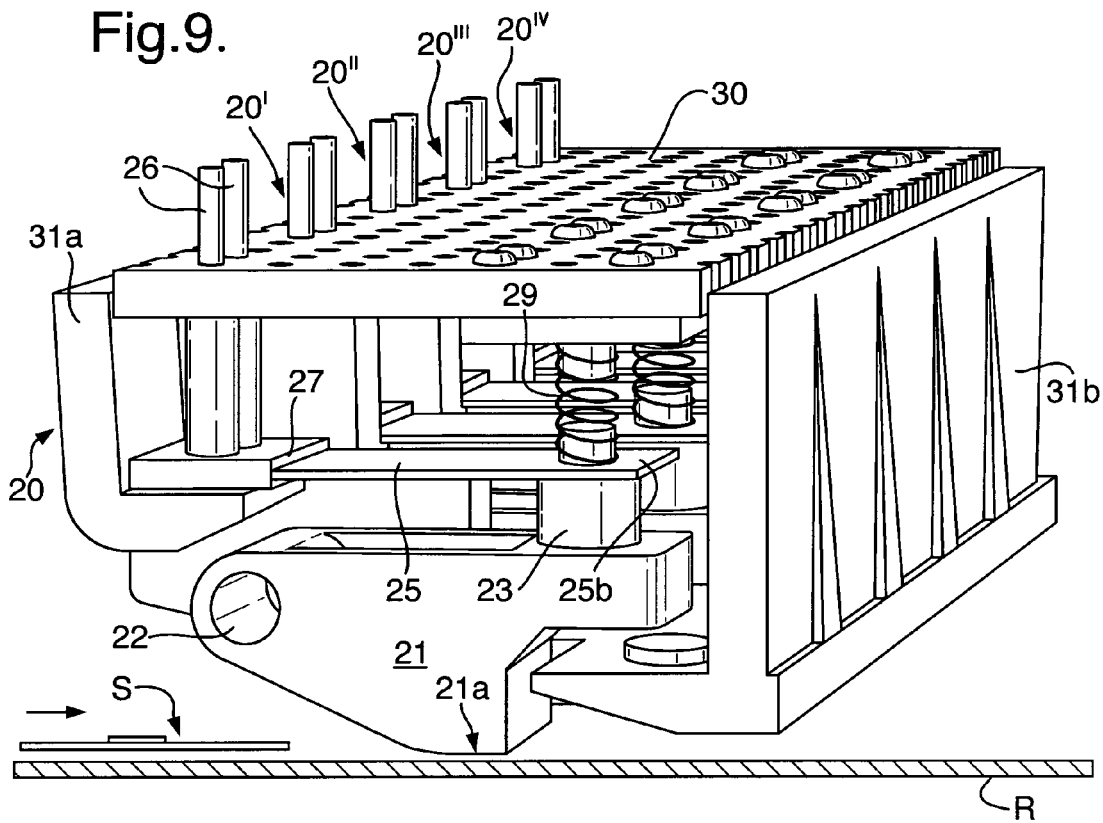
Figure 10:
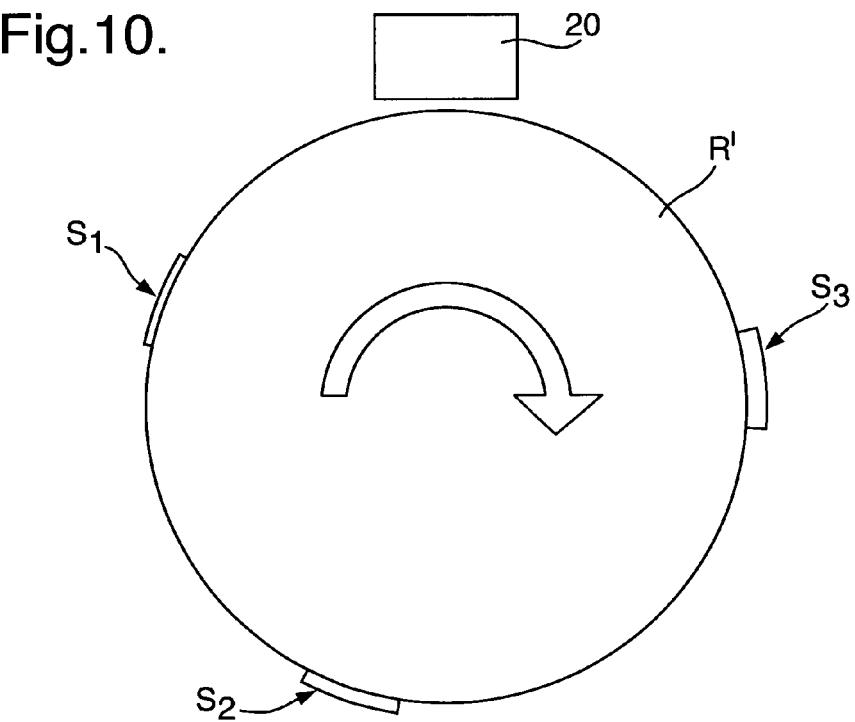
Figure 11A:
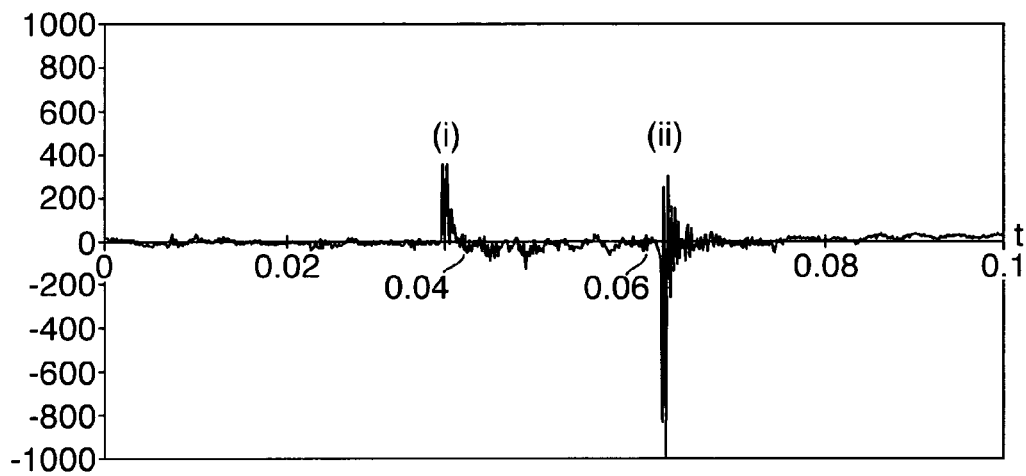
Figure 11B:
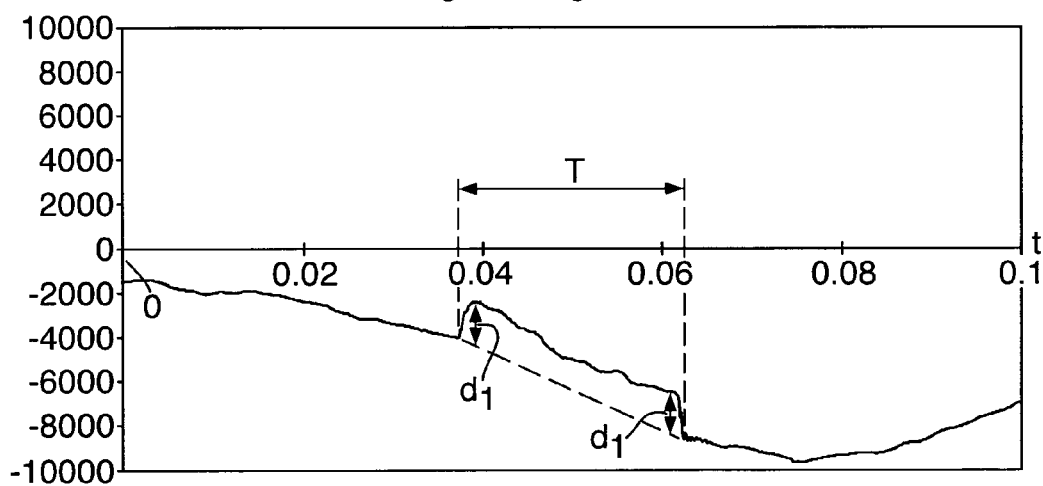
Figure 12A:
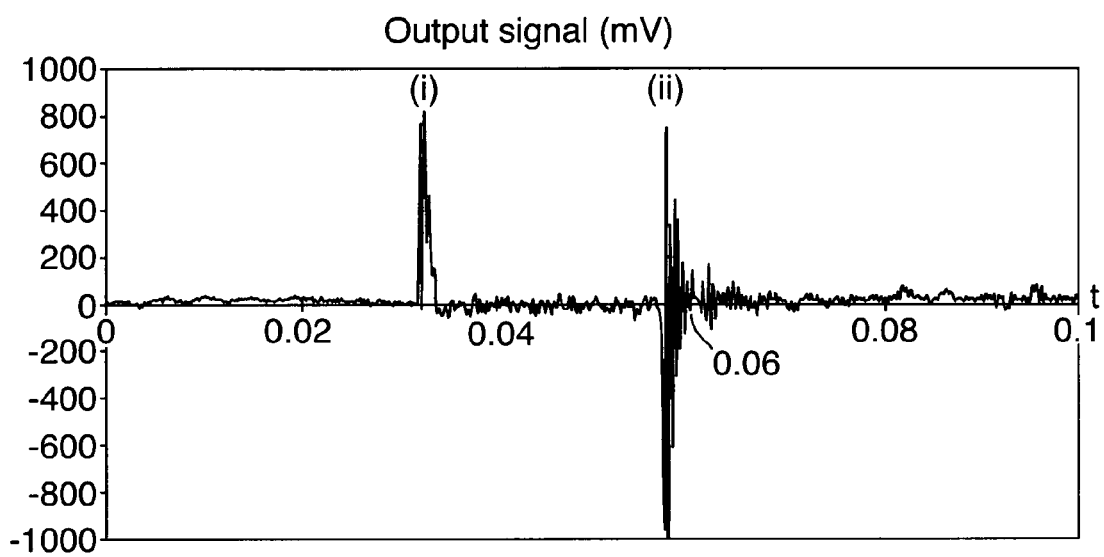
Figure 12B:
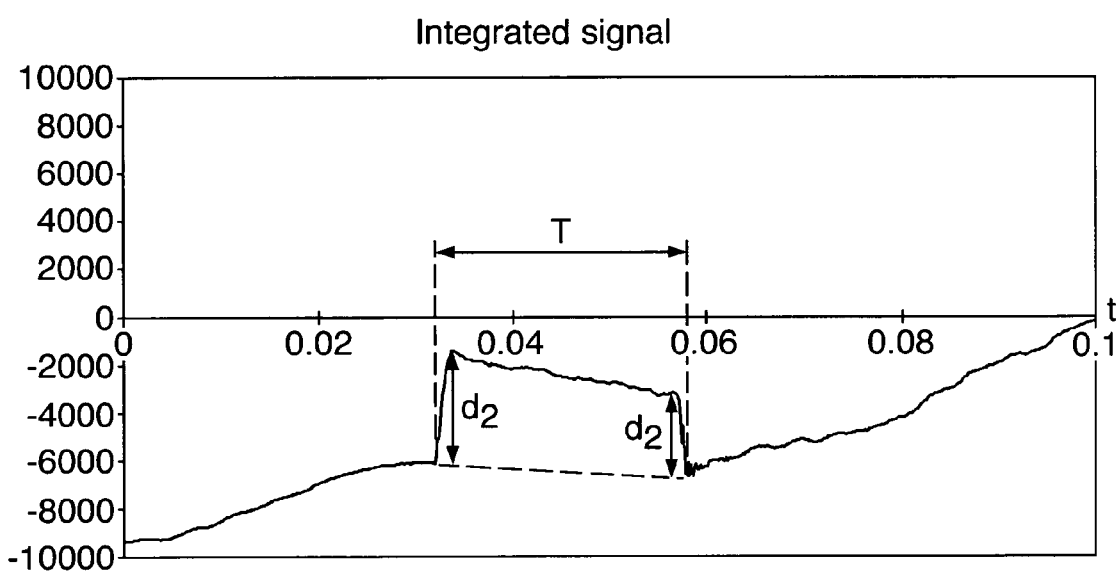
Figure 13A:
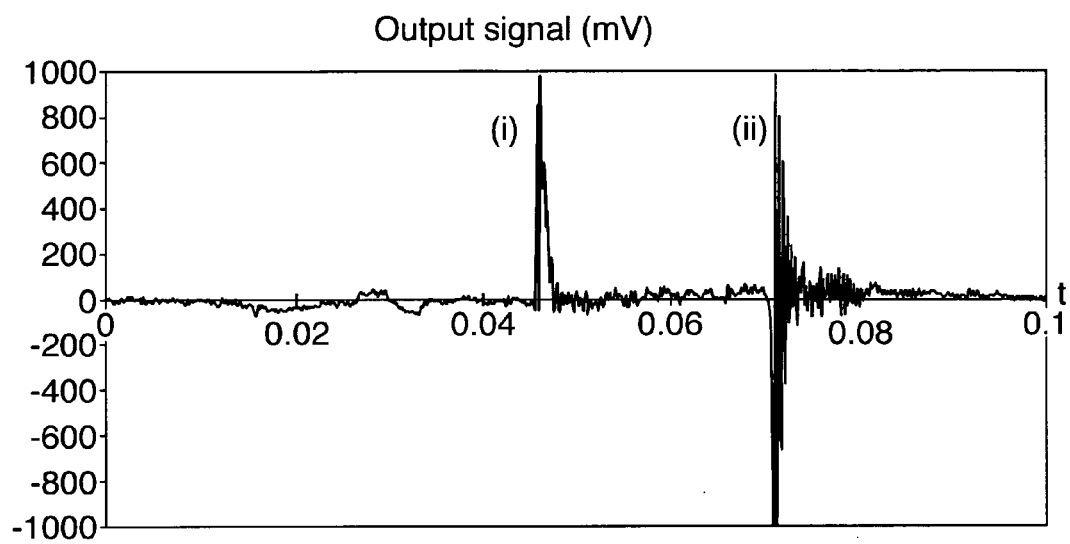
Figure 13B:
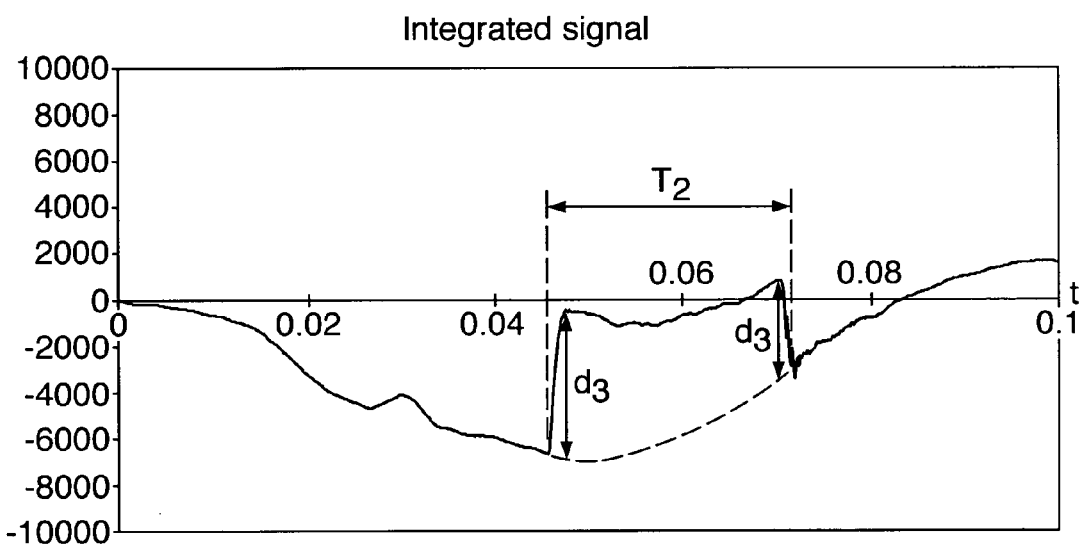
Figure 14:
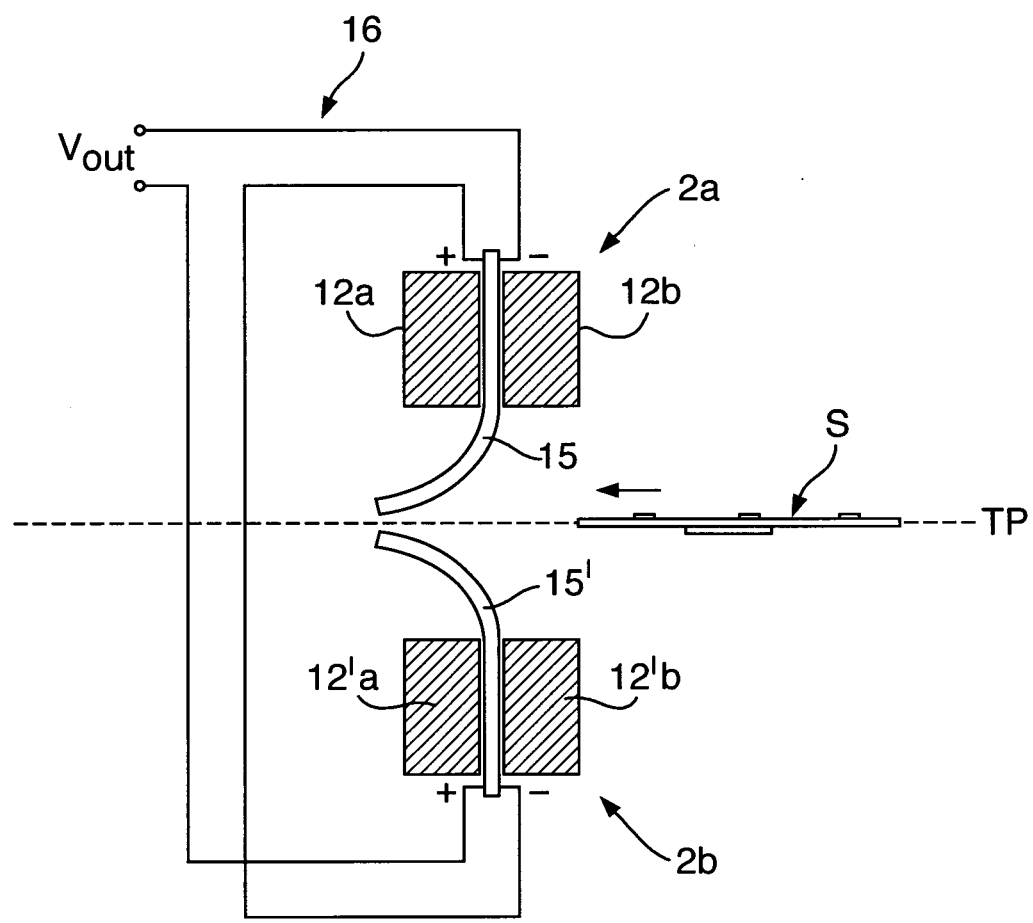
Figure 15:
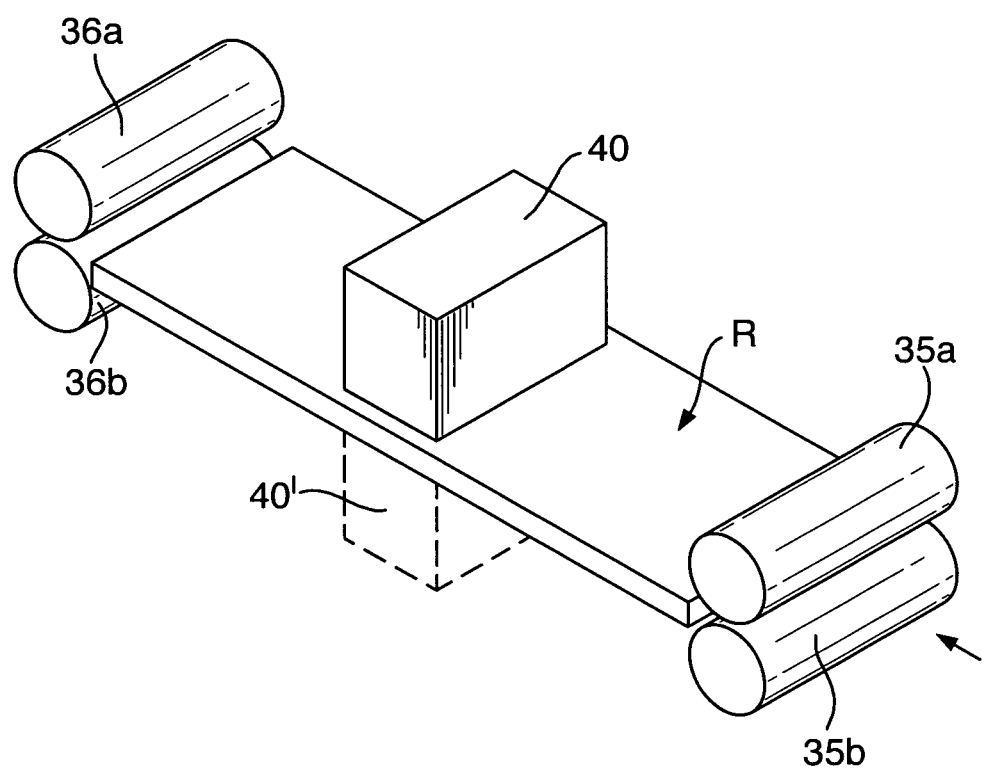
Figure 16:
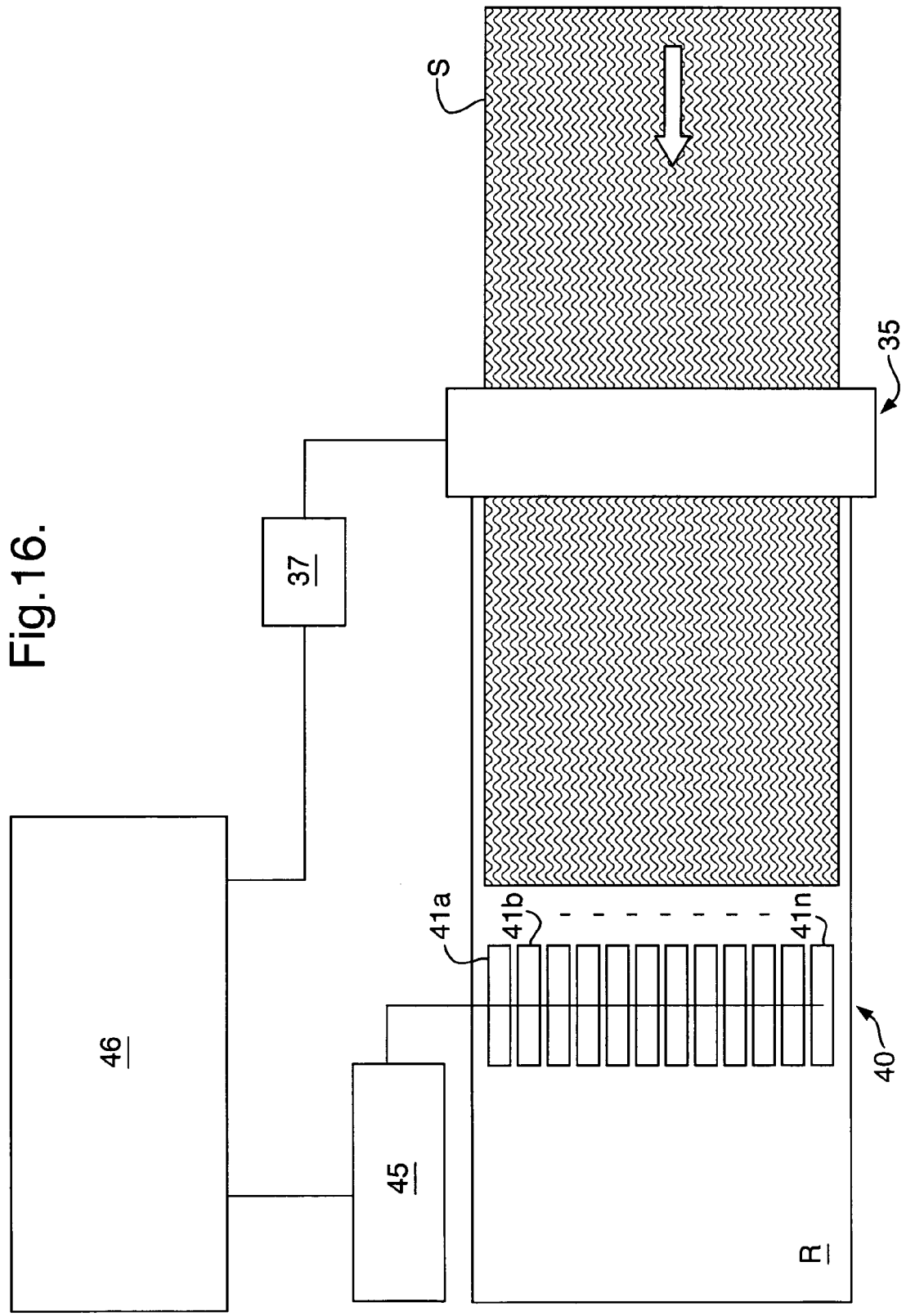
Figure 17:
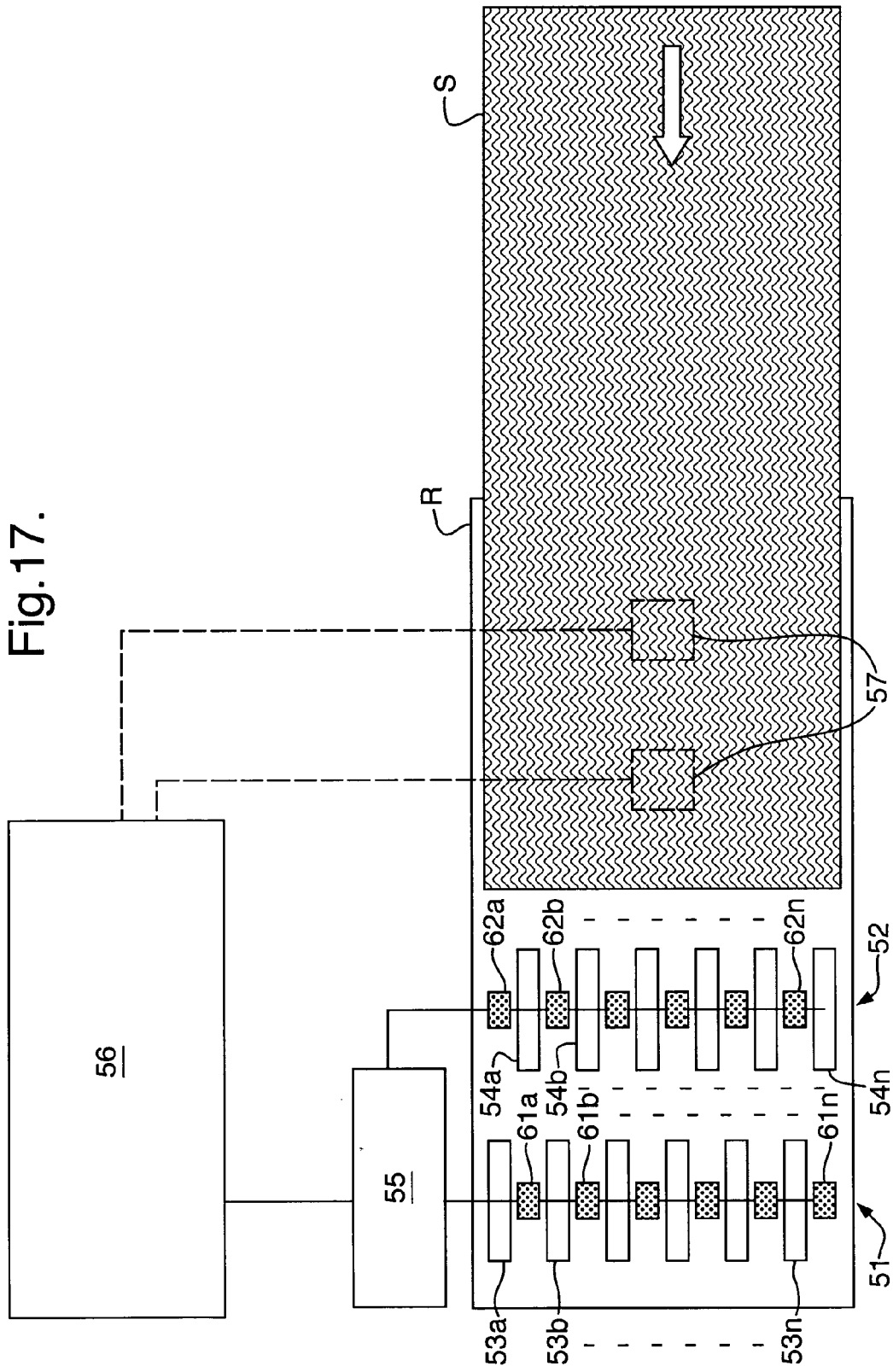
Figure 18:
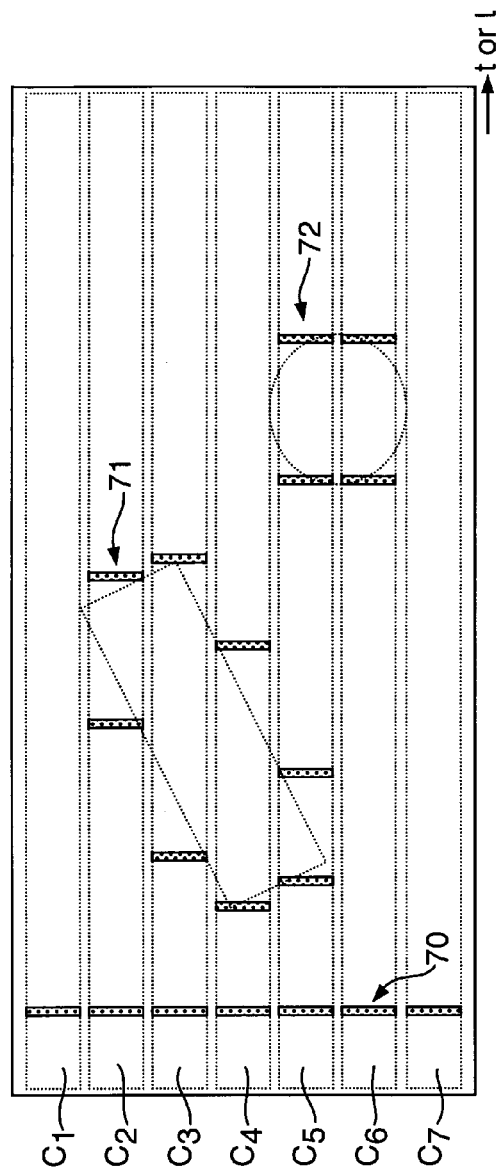
Figure 19:
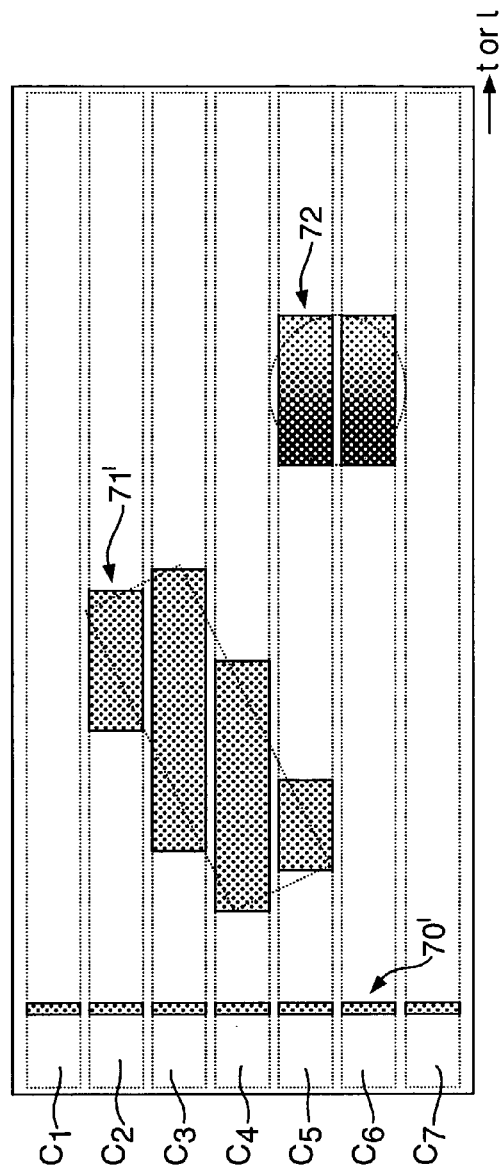

FIG. 3 schematically shows functional components of an apparatus for detecting thickness of a sheet document;

FIG. 4 depicts components of a first embodiment of apparatus for detecting thickness of a sheet document;

FIGS. 4a and 4b show an exemplary piezoelectric element used in the first embodiment, in perspective view and cross section respectively;

FIGS. 5a, 5b and 5c each depict selected components of the apparatus of FIG. 4 as a sheet document passes through the apparatus, alongside schematic plots showing an exemplary output signal at corresponding instances;

FIG. 6 is an exemplary plot showing the output signal over time for a first exemplary sheet document passing through the apparatus of FIG. 4;

FIG. 7 is an exemplary plot showing the output signal over time for a second exemplary sheet document using the apparatus of FIG. 4;

FIG. 8 is an exemplary plot of the peak output signal obtained for two exemplary sheet documents of different thicknesses at different transport speeds, using the apparatus of FIG. 4;

FIG. 9 shows components of a second embodiment of apparatus for detecting thickness of a sheet document;

FIG. 10 shows schematically components used in an experiment for testing the apparatus of FIG. 9;

FIGS. 11a and 11b show, respectively, the output signal for a first exemplary sheet document obtained using the arrangement depicted in FIG. 10, and corresponding integrated signal;

FIGS. 12a and 12b show the output signal for a second exemplary sheet document obtained using the arrangement of FIG. 10, and corresponding integrated signal;

FIGS. 13a and 13b show the output signal obtained for a third exemplary document using the arrangement of FIG. 10, and corresponding integrated signal;

FIG. 14 depicts components of a third embodiment of apparatus for detecting the thickness of a sheet document;

FIG. 15 schematically shows selected components of a first embodiment of an assembly for detecting the thickness of a sheet document in two dimensions, in perspective view;

FIG. 16 schematically shows the embodiment of FIG. 15 in further detail, in plan view;

FIG. 17 schematically shows components of a second embodiment of an assembly for detecting the thickness of a sheet document in two dimensions, in plan view;

FIG. 18 is a diagrammatic example of a map generated using the apparatus for detecting thickness of a sheet document, showing locations of thickness variations; and FIG. 19 is a diagrammatic example map generated using the apparatus for detecting thickness of a sheet document, illustrating actual thickness of a sheet document.

Figure 1:
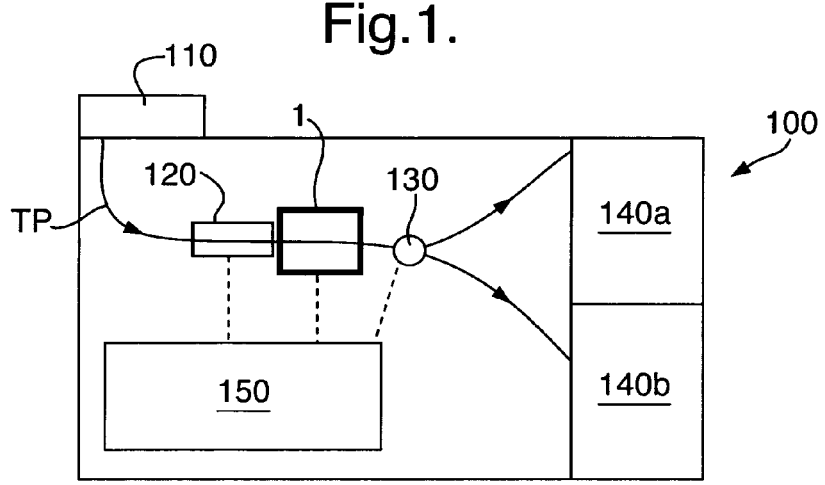
FIG. 1 illustrates a document handling apparatus incorporating an apparatus for detecting thickness of a sheet document.

A primary application of sheet document thickness detection apparatus is in document handling machines, such as currency handling machines, of which a schematic example is shown in FIG. 1. In this example, the document handling apparatus 100 includes an input module 110 and one or more storage modules 140a, 140b. A transport path TP conveys sheet documents such as banknotes from the input module 110 to the storage modules 140a, 140b, which act as outputs from the transport path. Along the transport path is provided a sensor module 120 which incorporates sensors arranged to detect characteristics of the documents and/or their location along the transport path. For example, the sensor module may include magnetic sensors, optical imaging sensors, and/or UV detectors to name but a few. Also provided on the transport path TP is a thickness detection apparatus 1, to be described in more detail below. The outputs from the sensor module 120 and/or the thickness detection apparatus 1 may be used by a processor 150 to control a diverter 130 to adjust the path taken by each sheet document within the apparatus and, in particular, to direct each document to a specific one of the storage modules 140a, 140b. Of course, many other arrangements of document handling apparatus are possible and in particular the transport path TP may operate in reverse, dispensing documents from the storage modules to a user.

Figure 2A:
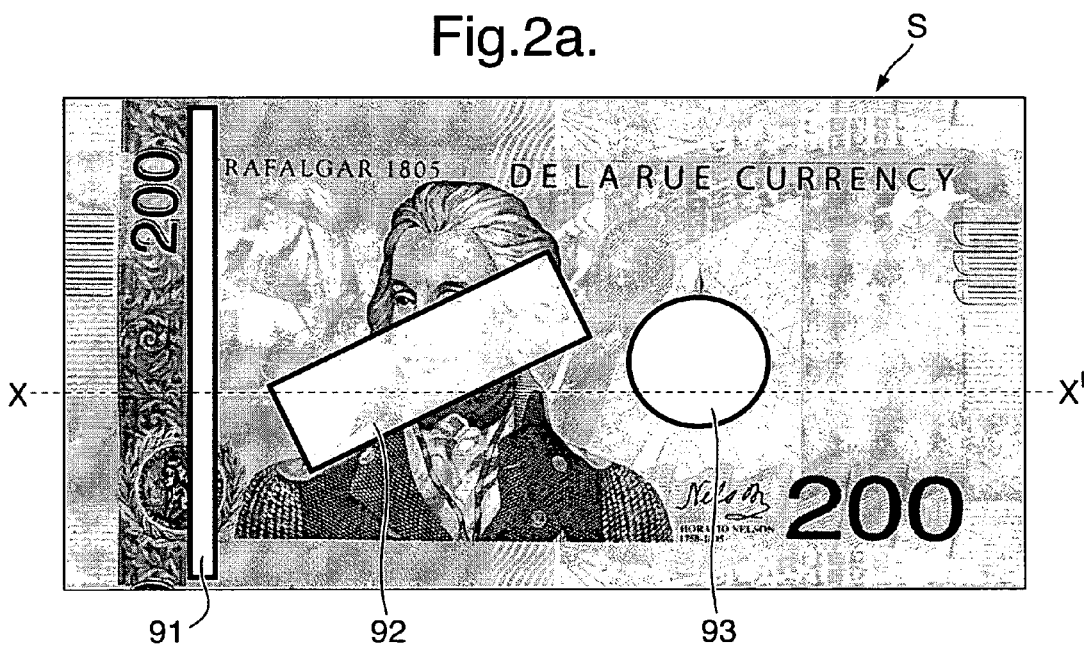
FIG. 2 depicts an exemplary sheet document.
Figure 2B:
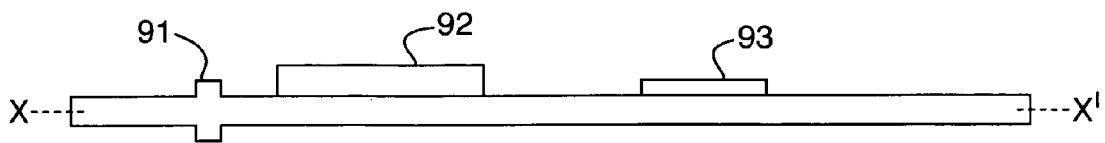

The thickness detection apparatus 1 can be used to measure the thickness, or to detect variations in thickness, of any sheet document such as printing paper, forms, cards, etc, but finds particular utility in the field of documents of value including banknotes, cheques, certificates, passports and the like. As such, the ensuing description will focus mainly on the example of detecting the thickness of banknotes, but it will be appreciated that the scope of the invention is not so limited. FIG. 2 shows an exemplary sheet document S in the form of a banknote, in plan view (FIG. 2a) and in cross section (FIG. 2b) along the line X-X'.

A sheet document such as that shown in FIG. 2 will typically have a reasonably constant "baseline" thickness corresponding to that of its substrate. However, the document may also show variations in thickness due either to inherent features of the document itself or to external factors. For example, the banknote S of FIG. 2 is shown to have three features 91, 92 and 93 which cause its thickness to deviate locally from the baseline substrate thickness. Feature 91 is a security thread, embedded within the document, which causes a local increase in the document thickness, typically by between 10 and 40 microns. Feature 93 is a hologram which is applied to the upper surface of the note and will cause a local thickness increase of a similar amount. Both of these features are integral components of the document. Other security features which may lead to local thickness variations include watermarks, embossings, windows, foil transfers and the like. Item 92 is a piece of adhesive tape which has been stuck to the surface of the document. In practice, tape can be present on banknotes for a number of reasons: to (legitimately) repair a note, by accident, or to help construct a fraudulent note. To distinguish between these scenarios it is desirable to be able to accurately measure the size and/or location of the taped region on the banknote. Certain tape sizes which are indicative of forgery or suggest that the note is no longer fit for reissue can then be sorted out of circulation.

FIG. 3 schematically illustrates some of the main components of an exemplary apparatus for detecting the thickness of a sheet document, preferred implementations of which will be discussed in more detail below with respect to specific embodiments. In FIG. 3, the thickness detection apparatus is denoted 1 and comprises a detection unit 2 located opposite a reference surface R. In use, a sheet document S such as a banknote is conveyed through the apparatus along a transport path TP between the detection unit 2 and the reference surface R. It should be noted that the provision of the reference surface R is not essential since this can be replaced by alternative components as will be described below. For clarity, FIG. 1 shows the various elements spaced from one another. However, in practice, the sheet document S will sit against the reference surface R and, as described below, contact will also be made with the detection unit 2 at a sheet document contact point 9. The sheet document S is schematically depicted as including a number of regions of increased thickness, which may or may not be the case since the same apparatus could be used, for example, to measure the thickness of a sheet document of constant thickness, to detect overlapping documents, or even to detect the leading and trailing edges of a document. However, the principles of detection are the same.

On passing through the nip defined between the (movable) sheet document contact point 9 and reference surface R, the sheet document S causes flexing of a piezoelectric element generally indicated at 5 via the contact point. As detailed below, the contact point 9 and piezoelectric element 5 can be related to one another in many different ways allowing for direct or indirect contact of the element 5 with the sheet document S. In the schematic illustration, piezoelectric element 5 is depicted as being located within detection unit 2, opposing reference surface R. However, whilst the piezoelectric element 5 forms a functional part of detection unit 2, it is not essential for the piezoelectric element 5 to be disposed in the same locality as the rest of detection unit 2, although in practice this will often be the case. As described below, the detection unit 2 may include one or more mechanical linking components for conveying motion caused by the passage of sheet document S from the contact point 9 to the piezoelectric element 5, which may therefore be disposed in any convenient location, potentially remote from the transport path TP.

As the sheet document S passes through the nip between the contact point 9 and reference surface R, the piezoelectric element 5 is caused to flex, preferably by bending or twisting although any other mode of flexing could be utilised. The element 5 includes a piezoelectric material such as piezoelectric polyvinylidene fluoride or lead zirconate titanate (PZT) or any other suitable piezoelectric material which generates an electric potential under conditions of mechanical deformation. The flexing of the element 5 caused by the passage of the sheet document S therefore leads to a voltage being established across the piezoelectric element 5, which is sensed using a circuit 6 electrically connected to the piezoelectric element 5. In some cases, the sensing circuit 6 may include an integrator 7 arranged to integrate the signal from the piezoelectric element 5 for reasons which will be discussed below. The output signal can be used in a number of ways, e.g. for control of a document handling apparatus incorporating the presently disclosed thickness detection apparatus, but more generally may be output by some form of output device 8. This could take the form of a graphical output such as a monitor or printer, or could provide some form of alarm signal. In either case, the output apparatus 8 may include a processor for carrying out additional operations on the signal, to be described below.

A first embodiment of the apparatus is depicted in more detail in FIG. 4. Here, an incoming document such as a banknote S is arranged to directly contact a piezoelectric element 15. Thus, the sheet document contact point is provided by the piezoelectric element itself. The detection unit comprises a housing incorporating clamps 12a and 12b which hold the piezoelectric element 15 in fixed relation to the transport path (and, in this case, to the reference surface R). In this example, the piezoelectric element 15 takes the form of a planar, elongate sheet, of which a cross-section along its long axis is shown in FIG. 4. The thickness of the piezoelectric element 15 (exaggerated for clarity in the Figure) is substantially less than either of its lateral dimensions (only one of which is visible). A first portion of the piezoelectric element including a first end 15a is fixed by clamp elements 12a and 12b. The distal end 15b of the elongate element forms part of a second portion which is free to move relative to the first. In this example, the element is arranged such that end 15b is pressed against reference surface R, causing the piezoelectric element 15 to adopt an arcuate shape in its rest position (as shown in FIG. 4). In this configuration, the applied stress experienced by the element results in distal end 15b being urged toward the reference surface R by virtue of the piezoelectric material's natural resilience. The arcuate shape of the element is arranged such that the end 15b is downstream of the clamp 12a, 12b, in order that the curvature of the element assists rather than hinders the passage of the banknote S.

An exemplary piezoelectric element 15 is shown in more detail in FIGS. 4a and 4b. FIG. 4a shows the element without any protective cover, in perspective view, whereas FIG. 4b shows the complete element in cross section. In both cases, the element 15 is shown in an unstressed configuration for clarity. A suitable element of this sort is available from Measurement Specialties, Inc., of Hampton, Va., USA. The element 15 comprises a body of piezoelectric material 17 which extends from the first (fixed) region 15a of the element to the second region 15b of the element. The piezoelectric material is connected to a sensing circuit 16 via electrodes 18a and 18b of suitably conductive material, applied to each surface of the piezoelectric material and connections 16' such as rivets. The electrodes 18 preferably extend substantially the full length of the element 15 as shown. Optionally, additional layers may be included in the element 15. For example, FIG. 4b shows the element provided with hard wearing, protective outer layers 19a and 19b, provided on one or both sides of the element. In other examples, a protective cover layer could be bonded to the piezoelectric element only in the region to be contacted by the sheet document in use. However if desired this too could extend the full length of the element as shown. The functions of the electrodes 18 and the protective cover 19 may be combined by use of a suitably hard wearing, conductive material such as spring steel. The layer may also or alternatively be provided to enhance the spring force of the element, co-operatively deforming with the piezoelectric material and restoring the element to its rest position.

In its simplest configuration, the sensing circuit 16 may take the form of a voltmeter, oscilloscope or other similar device for measuring a voltage or current generated by the piezoelectric element 15. The banknote S is conveyed through the apparatus by a transport assembly (not shown) which may form part of the thickness detection apparatus 1 itself or could be provided externally (e.g. as part of a document handling machine 100 in which the present apparatus may be incorporated).

The signal output by the sensing circuit will be monitored over time. Typically, a timer such as a counter or clock will be provided by the circuit 16 or additional processing means, in order that the output signal can be directly related to the passage of documents through the apparatus and that features within the output signal can be compared. However this is not essential if, for example, the apparatus is to be used as a doubles detector where all that is required is notification that the measured thickness has passed a certain threshold.

FIG. 5 shows in more detail the response of the piezoelectric element to a sheet document S. FIG. 5a shows initial contact between the leading edge LE of the sheet document S and the second portion of the piezoelectric element 15. The inherent baseline thickness of the document S causes displacement of the end 15b of the element, as shown, away from the reference surface R to enable passage of the sheet document S therebetween. The flexing of the piezoelectric material leads to the generation of a voltage which is detected by the circuit 6. Since the level of induced voltage is proportional to the rate of deformation of the piezoelectric element (rather than to the amount of deformation), the passing of the leading edge LE will cause a peak in the measured voltage as the element flexes. The element's resilience causes the end 15b of the element to return towards the reference surface R once the leading edge has passed, such that the piezoelectric element returns to rest on the surface of the sheet document S. Inevitably, there will be some oscillation of the piezoelectric element 15 before it returns to rest although this can be damped by appropriate design of the element 15, as well as increasing the pressure between the element and the reference surface and the angle at which the piezoelectric element is held against the surface R. FIG. 5b shows the oscillations in the signal as the piezoelectric element comes to rest. FIG. 5c shows the first of three regions of increased thickness on the document S encountering the end 15b of the piezoelectric element. This leads to a second peak in the output voltage. It will be noted from the schematic plots in FIG. 5c that the baseline voltage remains constant (and typically at zero) throughout, despite the presence of the thickness of document S between the piezoelectric element 15 and the reference surface R after the first peak. This is due to the voltage response being related to the rate of deformation and not to the amount of deformation.

An exemplary output signal, in terms of the absolute voltage generated by the piezoelectric element 15 (irrespective of sign), obtained from the passage of a first exemplary sheet document of constant approximate thickness 240 microns, is shown in FIG. 6 over a period of approximately 0.1 seconds. The sheet document is conveyed through the apparatus at a speed $V_1$. This speed may be known, for example, via control of the transport assembly or through the provision of conventional track sensors (not shown). In the present example, the sheet document is travelling at approximately 0.59 m/s. As the leading edge of the sheet document encounters the piezoelectric element 15, a first peak in the output signal, here reaching approximately 0.9 volts, is observed. The peak voltage decays over a period of approximately 0.3 seconds as the piezoelectric element 15 returns to rest. It will be noted that the decay curve includes approximately periodic spikes and these represent oscillation of the element. The duration of the decay curve can be reduced by increasing damping of the piezoelectric element (by providing a greater restorative force) and/or designing the element 15 to have a higher resonant frequency, e.g. by decreasing the length of the element. At t=approx. 0.09 seconds, a second peak of around 1.1 volts is observed. This corresponds to the trailing edge of the sheet document. Thus, the two peaks represent locations at which a change in thickness is encountered by the apparatus. The time period $T_1$ between the first peak and the second peak is representative of the length of the sheet document in the direction of transport. Thus, if the speed of transport $V_1$ is known, the length of the document can be deduced from the period $T_1$ if desired. Conversely, if the length of the sheet document is known, the time $T_1$ could be used to determine the speed $V_1$.

A second exemplary output signal obtained from a second sheet document is shown in FIG. 7. In this example, the sheet document has a tape approximately 40 microns thick applied to its upper surface near its centre, but it is otherwise identical to that which produced the FIG. 6 plot. In the present example, however, the speed $V_2$, is reduced to approximately 0.3 m/s. In the signal, the first peak at t=0 corresponds, as before, to the leading edge of the sheet document encountering the piezoelectric element. Again, the output signal then decays to near zero. The second peak at around 0.06 seconds is caused by a first edge of the tape striking the piezoelectric element. It will be noted that this peak is of lesser magnitude than that caused by the leading edge of the document and this is due to the rate of deformation experienced by the piezoelectric element being correspondingly lower as a result of the lesser thickness of the tape 40 micron thick tape as compared with the 340 micron thick sheet document. The third peak, at approximately t=0.14 seconds and of approximately equal magnitude is indicative of the trailing edge of the tape. Finally, the fourth peak at approximately 0.2 seconds corresponds to the trailing edge of the sheet document. Thus, using the same principles as discussed in relation to FIG. 4, the length of the sheet document and of the tape in the direction of transport can be deduced from knowledge of the time periods $T_1$ and $T_3$ and the velocity $V_2$. The position of the tape relative to the leading and trailing edges of the sheet document can also be identified, as well as its length.

Thus, direct output signals of the sort described above can be used to obtain a significant amount of information about the sheet document including, potentially, its own dimensions as well as the occurrence of regions of varying thickness within the sheet document. Such variations could either be caused by the presence of foreign bodies such as tape (as in the example described above), or could result from the presence of items such as security elements intentionally provided to the document such as holograms, threads, patches and the like. The output signal can be used in a variety of ways as appropriate to the intended application. For example, the apparatus could be arranged to trigger an alarm if unexpected variations in thickness (possibly indicative of tape, or overlapping documents, for example) are identified. Alternatively, the signal could be compared with a predetermined signal profile which has previously been obtained from a document of the same sort. For example, a document such as a banknote including a certain arrangement of security elements will have a profile with a series of peaks corresponding to each of the security elements. Typically, one or more such profiles will be stored in a memory for each denomination or currency of note which the apparatus is expected to encounter. These stored profiles can then be compared with profiles of each sheet document measured during processing and used as part of an authentication or denomination process.

In a particularly preferred application, the extent of an unexpected thickness variation—generally indicative of tape—will be determined, and compared with predefined limits to determine whether a document should be removed from circulation.

However, whilst output signals of this sort may be appropriate in many applications, they do not provide an accurate measurement of the actual thickness exhibited by the sheet document, nor the magnitude of any thickness variations. As shown in FIG. 7, the amplitude of the peak signal will be related to the actual thickness, but not in a directly proportional manner. It has also been found that changing the speed of transport affects the peak amplitude (FIG. 8). However, the present inventor has found that a true measure of the thickness (or change in thickness) may be obtained by integrating the output signal as will be described in more detail with reference to the second embodiment below. Since the voltage generated by a piezoelectric element is proportional to its rate of deformation, the integrated output voltage (or current) over time, can provide a measure of the actual thickness encountered. A significant advantage of this approach is that the thickness measurement requires no baseline calibration, being based on a rate of change.

FIG. 9 is a cut-through CAD illustration showing components of a second embodiment of apparatus for detecting sheet document thickness. In this embodiment, a housing made up of upper plate 30, upstream wall 31a and downstream wall 31b is provided to support a plurality of detection units 20 alongside a reference surface R. Here, five detection units 20, $20^i$, $20^{ii}$, $20^{iii}$ and $20^{iv}$ are depicted, although any number could be employed. The endmost detection unit 20 will be described by way of example but it will be appreciated that each of the adjacent detection units $20^i$ to $20^{iv}$ are of identical construction.

The detection unit 20 comprises a piezoelectric element 25 and an intermediary assembly 21 which is disposed between the piezoelectric element 25 and the reference surface R in this example, such that there is no direct contact between sheet documents and the piezoelectric element. The intermediary assembly 21 acts to impart motion caused by the passage of sheet document S to the piezoelectric element 25. In this example, the intermediary assembly 21 is a unitary component formed for example of moulded plastic which is pivotably attached to housing wall 31a at pivot point 22. The component 21 includes a contact surface 21a (providing the sheet document contact point) which is arranged to face, and preferably abut, reference surface R. The contact surface 21a is preferably located downstream of pivot point 22 with a downwardly curved surface therebetween in order to permit the passage of the sheet document S through the nip created between contact surface 21a and reference surface R. The intermediary member 21, in this example, includes a block 23 on its upper surface adjacent its end away from pivot point 22, which contacts a distal region of the piezoelectric element 25. At its other extremity, piezoelectric element 25 is contained within a fixture 27 attached to housing wall 31a which holds the end portion of piezoelectric element 25 fixed in relation to reference surface R and also provides the necessary electrical contact 26 with a sensing circuit (not shown). Movement of the component 21 about its pivot point 22 thereby applies a bending moment to the piezoelectric element 25 near its distal end 25b. In this example, contact between distal end 25b of the piezoelectric element and the component 21 is maintained by means of a compression spring 29 which is seated between the upper wall 30 of the housing and a pin extending from block 23 through the piezoelectric element 25, although engagement between the piezoelectric element 25 and the component 21 could be achieved in many other ways. However, the configuration shown is convenient since the spring 29 also acts to urge contact surface 21a towards the reference surface in use.

As in the case of the first embodiment, the piezoelectric element 25 may comprises additional layers for protection of the piezoelectric material or rigidity, for example. In a particular preferred implementation, the piezoelectric material is bonded to a support layer along its full length, the support layer providing a secure mounting point (replacing fixture 27), a hard wearing tip at least in the distal region and enhanced restorative force.

When in use a sheet document S is transported into the nip between reference surface R and contact surface 21a, the thickness of the sheet document causes component 21 to be displaced, pivoting in an anti-clockwise sense (as viewed in FIG. 9) so as to apply a bending moment to the piezoelectric element 25. As previously discussed, such deformation leads to the establishment of a voltage across the surfaces of the piezoelectric element 25 which is detected by the sensing circuit. The second and subsequent detection units $20^i$, $20^{ii}$ etc. output signals of the same sort in response to thicknesses as sensed along corresponding channels laterally spaced from but parallel to that of end-most detection unit 20.

FIG. 10 shows an experimental arrangement used to test the detection apparatus. Here the reference surface R' is provided by a roller which is arranged to rotate relative to a detection unit 20. In this experiment, a single detection unit 20 is used which corresponds to the detection unit 20 shown in FIG. 9, albeit without the presence of additional detection units $20^i$, $20^{ii}$ etc. On the reference surface R' are provided three exemplary sheet documents $S_1$, $S_2$ and $S_3$ which are passed in turn under the detection unit 20 at a speed, in this example, of approximately 2.4 m/s. Thus, in this example, the reference surface R' is rotating relative to detector unit 20, but the spacing between the detector unit 20 and the surface R' remains substantially fixed at all points of rotation, varied only by minor deviations in the surface of the roller.

FIG. 11a shows the output voltage generated by the piezoelectric element 25 as the first exemplary sheet document $S_1$ with a constant approximate thickness of 90 microns passes the detector unit 20 (it should be noted that, unlike FIGS. 6 and 7, in FIG. 11a the output signal is the actual voltage, inclusive of sign, rather than the absolute voltage magnitude, hence the occurrence of negative values: the absolute value could be used if desired). The first peak (i), at approximately 0.04 seconds, is indicative of the leading edge of the sheet document $S_1$. The second peak (ii), at approximately 0.06 seconds represents its trailing edge. This output signal can be used for all the applications described already with respect to the first embodiment. However, in this embodiment, the sensing circuit also includes an integrator arranged to integrate the output voltage over time, and the resulting output signal is shown in FIG. 11b. Here, the units on the vertical axis are those of the running summation of the voltage signal in mV, which is of course dependent on the sampling rate of the signal. In this example, an approximate correlation constant of 1000 units=45 microns can be applied.

Integration can be performed in a number of ways but, preferably, an analogue integration circuit such as an integrating amplifier is provided. Digital implementations are also possible (and were used in the present example) whereby an analogue-to-digital converter is provided to sample the output voltage at predetermined intervals and a processor is provided for computing the integral (e.g. by outputting a running sum). The integrated signal provides a measure of the actual thickness encountered by the apparatus. It will be noted that in FIG. 11b, the baseline of the signal appears to meander between values of approximately −2,000 and −10,000. This is due to slight variations in the surface of the roller R': measurements about the experimental drum showed the surface to deviate by 300 to 500 microns from perfectly round. However, in practice, for a reference surface fixed relative to the detection unit, the baseline will be substantially flat and can be set to zero. The sheet document $S_1$ is represented by the step in the signal demarcated by abrupt jumps labelled $d_1$. The first such jump (i) at approximately t=0.04 seconds corresponds to the leading edge of the sheet document $S_1$, and the second jump (ii) at approximately t=0.06 seconds corresponds to the trailing edge. The magnitude $d_1$ provides a measure of the thickness of the sheet document $S_1$.

In addition to providing all the information obtainable from the voltage or current output, the integrated signal can therefore be used to provide a measure of the thickness of the sheet document, and/or of the magnitude of any variations in thickness across the document (none of which occur in the present example). This can be utilised, for example, in doubles detection, in authentication/denomination (if an expected document thickness is known), or to discriminated between known features of the document and foreign bodies such as tape. The 'actual' thickness profile can also be compared with pre-stored profiles in a similar manner to that discussed above.

FIGS. 12a and 12b provide corresponding output voltage signals and integrated signals for the second exemplary sheet document $S_2$, of thickness 180 microns. Again, the first peak (i) is indicative of the document's leading edge, whereas the second peak (ii) corresponds to its trailing edge. A corresponding step is apparent in the integrated signal, the height $d_2$ of which, relative to the baseline signal, provides a measure of the document thickness. It is noted that in this example the thickness of the trailing edge appears to be less than that of the leading edge: this is due to clipping of the raw signal at −1V in this experiment. In practical implementations, any such clipping would preferably be reduced to avoid such effects, although even with the clipping the effect on the integrated signal is minor.

FIGS. 13a and 13b show the corresponding output voltage signal and integrated signal for the third exemplary document $S_3$, which has a thickness of approximately 270 microns. Again, its leading and trailing edges are apparent from the output voltage peaks (i) and (ii) respectively and the height $d_3$ of the apparent step in the integrated signal provides a measure of the document thickness.

In each of the above embodiments, the detection unit opposes a fixed reference surface provided in the document transport path. However, alternative configurations are also envisaged. A third embodiment of thickness detection apparatus is shown in FIG. 14. Here, a second detector unit 2b is provided on the opposite side of the transport path TP from the first 2a, and the contact points of each are arranged to oppose one another. The sheet document S is conveyed, as before, along the transport path TP by guiding and transport components disposed upstream and/or downstream of the thickness detection apparatus. On reaching the apparatus, the sheet document is conveyed between the two detection units 2a and 2b, causing deflection of one or both piezoelectric elements. In this example, each detector unit 2a and 2b is configured in the manner of the first embodiment described above, with a piezoelectric element 15, 15' arranged for direct contact with the sheet document. The two piezoelectric elements 15, 15' preferably contact one another and are urged against one another using their intrinsic resilience. However, this is not essential and the elements could be spaced from each other if preferred so as only to detect objects having a certain minimum thickness. In this case the piezoelectric elements may be pre-stressed to hold the curved shape as shown, or may extend straight towards the transport path.

Each of the piezoelectric elements 15, 15' is connected to the sensing circuit 16 such that the output signal is based on the voltage generated across each of the elements. Preferably, as shown, the two elements are arranged such that each will undergo deflection in the opposite sense upon passage of a sheet document. In this way, the sum of the two generated voltages will represent the net displacement caused by the sheet document. The sum could be calculated by suitably programmed processing means, but preferably the elements are connected to the sensing circuit in series, as shown, to automatically obtain the summed voltage.

Provision of a detection unit on each side of the transport path in this way has the advantage that local thickness variations can be detected with equal accuracy whichever face of the sheet document they occur on. For instance, in the first and second embodiments, should a piece of tape be located on the surface of the document facing the reference surface R, the document substrate would form a bow against the reference surface, masking the precise extent of the tape. This is avoided by providing a detector unit on both sides of the document.

It will be appreciated that the same advantages can be achieved by opposing two detector units of the form described with respect to the second embodiment.

The use of single-channel thickness detection apparatus as described with reference to the first embodiment, and also used in the experimental arrangement of FIG. 10, provides useful information as to the thickness profile of a document in the direction of transport. However, in many cases it is also desirable to be able to resolve the obtained thickness information in the direction perpendicular to the direction of transport, i.e. across the width of the document. For instance, the document may be carrying a taped region which is localised both in a direction parallel to the direction of transport and in the perpendicular direction. The use of a single-channel detection unit will provide information as to the extent of the tape in the direction parallel to transport (providing the channel at least partially coincides with the tape), but no information as to where the tape is positioned laterally will be obtainable, nor its dimension.

For these reasons, in preferred embodiments, a plurality of detection units (or detection unit pairs) such as those utilised in the first, second or third embodiments are provided, spaced laterally from one another in the direction perpendicular to transport so as to form an assembly capable of two-dimensional thickness detection. Each detection unit or pair is arranged to sense the thickness of the sheet document in a corresponding region which is narrow compared to the document's width along its leading edge. One example of such an arrangement was previously shown in FIG. 9. Each detection unit 20 is preferably arranged such that the contact surface 21a is substantially narrower than the width of the sheet document S perpendicular to the direction of transport. As such, the detection unit 20 will only respond to changes in thickness which occur within the narrow "channel" defined by the width of the contact surface 21a as the document S is conveyed through the apparatus. Likewise, each adjacent detection unit $20^i$, $20^{ii}$ etc, will output a signal relating only to the thickness of the document along corresponding parallel channels. The narrower the width of the contact surface 21a and the closer the spacing of the detection units 20, the better the resolution in the perpendicular direction. The output signals from each of the detection units 20 can be used in combination to detect thickness of the sheet document in two dimensions. Output signals of the types discussed with respect to FIGS. 11, 12 and 13 will be produced by each of the detection units 20, $20^i$, $20^{ii}$ etc, and can be compared with one another to deduce the lateral position of any detected thickness or variations in thickness, based on knowledge of the relative locations of the channels.

FIGS. 15 and 16 schematically depict components of a embodiment of an assembly which operates on this principle. FIG. 15 shows selected components in perspective view. Here, a plurality of detection units are represented by block 40, which is shown to extend across the width of the transport path in a direction approximately perpendicular to the direction of transport. In this example, the detection units 40 oppose reference surface R (as in the first and second embodiments), although this may be replaced by a second set of detection units 40' arranged to oppose detection units 40 (as in the third embodiment) if preferred. Documents S are conveyed through the apparatus past the detection units 40 by a transport assembly. In this example, the transport assembly comprises at least an upstream pair of driven rollers 35a and 35b and a downstream pair of driven rollers 36a and 36b and may form part of the detection apparatus or could be provided by a document handling machine in which the detection apparatus is incorporated, such as machine 100 of FIG. 1. Any other suitable document transport means could alternatively be used such as conveyor belts, etc. A document S enters the detection apparatus in the direction indicated by the arrow.

FIG. 16 shows the same apparatus in plan view, although downstream roller pair 36 has been removed for clarity. The plurality of detection units 40 is also shown in terms of its constituent units 41a, 41b . . . 41n and it will be seen that these are arranged in a straight array across the width of the document transport path, substantially perpendicular to the direction of transport. The sensing circuit of each detection unit is represented by block 45 which may, as previously described, include integration means. The output signals are transferred to an output means or processor 46, which may be combined with a processor 150 of a document handling machine 100 is desired. Integration means could be included within processor 46 rather than sensing circuits 45 if desired. As previously described, in many cases it is useful to have an accurate indication of the speed of transport in order that dimensions and locations in the direction parallel to document transport can be deduced from the output signals. As such, in the present embodiment a controller 37, forming part of the transport system and connected for example to transport roller pair 35, provides information as to the transport speed to the processor 46. The processor 46 can thus compile each of the output signals from the detector units 41a, 41b etc to deduce the thickness of the document S, or identifying thickness variations, in two dimensions.

It will be appreciated that, in order to obtain two-dimensional information, it is not essential that the detector units 41a, 41b etc, be arranged along a straight line perpendicular to the direction of transport. If desired, the detector units could be staggered or otherwise displaced from one another parallel to the transport direction. In such cases, the known degree of separation in the transport direction can be used to apply an appropriate time delay to one or more of the output signals, in order that the output signals from each of the detection units are synchronised with one another.

To improve document handling, it is generally preferred that the document is under the control of multiple transport points at any one time. In the embodiment of FIG. 16, the provision of a linear array of detector units across the whole width of the transport path means that there is no space for transport components at this point on the document path. As such, control of the document can be effected only by components upstream and downstream of the detector units.

A fourth embodiment shown schematically in FIG. 17 overcomes this problem by the use of two arrays 51 and 52 of detection units spaced from one another in the direction of transport. In this example, the first array of detection units 51 comprises a series of spaced detection units 53a, 53b . . . 53n, which are alternated with transport components 61a, 61b . . . 61n, such as rollers (which may be driven or undriven, or a combination of the two and may be opposed by corresponding rollers extending through apertures in the reference surface R). Thus, the detection units making up array 51 will provide information as to the thickness of the sheet document in a series of spaced channels parallel to its long edges, whilst the sheet document S is fully under control of the transport assembly simultaneously with the thickness detection. However, the provision of transport units 61a, 61b . . . 61n prevents the thickness being measured across the full width of the sheet document, limiting the lateral resolution achievable. This is solved by providing a second array 52 spaced from the first in the direction of transport, which comprises alternating detection units 54a, 54b . . . 54n and transport components 62a, 62b . . . 62n arranged in a linear array substantially perpendicular to the direction of transport. The first and second arrays 51 and 52 are offset relative to one another such that the detection units of one align with the transport components of the other. The combination of the arrays 51 and 52 ensures that thickness is detected across the full width of the sheet document whilst not compromising on transport control.

Any number of such arrays could be used in this way, with any number of detection units (including a single detection unit) in each array. Similarly, the detection units and transport components need not alternate, but may be arranged in groups.

As in the previous embodiment, each of the detection units 53a, 53b to 53n and 54a, 54b to 54n are connected to respective sensing circuits represented by block 55, which may include integration means. The output signals are transferred to a processor or other output means 56. Again, it is desirable to have knowledge of the document transport speed and, in this case, this is achieved by the provision of track sensors 57 such as optical sensors or otherwise, which can be used in a conventional manner to provide processor 56 with a measurement of the document transport speed. Of course, the transport speed could alternatively be a known value provided by the transport control system, or a hard encoded value. Since the array 52 is upstream of array 51, it will encounter each document (and hence each change in thickness) a short time before the same reaches array 51. To account for this, the output signals from units 52a, 54b . . . 54n will preferably be delayed relative to those from units 53a, 53b . . . 53n by a time lag corresponding to the time required for the leading edge of the document to be conveyed from array 52 to array 51 (=distance between arrays 51, 52 along note path/speed of transport). This could be performed by the sensing circuits or by the processor.

The output signals can be utilised in a number of ways, including all of the options previously discussed with reference to the first and second embodiments. In a particularly preferred example, the processor 46 or 56 is arranged to generate a two-dimensional map from the collated output signals. Examples of such maps are shown in FIGS. 18 and 19.

In FIG. 18, the non-integrated output signals are used from each of seven detection units, each corresponding to a channel $C_1$ . . . $C_7$ and representing a region perpendicular to the transport direction. It should be noted that, using the apparatus of FIG. 17, these signals could be provided by a combination of selected detection units selected from both array 51 and array 52. The value along the x-axis may represent time (as shown in the profiles depicted in FIGS. 11 to 13) or could be directly converted to a distance in the direction parallel to note transport, i.e. length of the sheet document, based on the known speed of travel. Peaks in the output signal (which may be voltage or current) are represented by shading. In this example, each of the channels $C_1$ . . . $C_7$ detect a first change in thickness which is indicated at 70. The fact that this is detected simultaneously in all seven of the channels indicates that the change in thickness occurs across the whole width of the transport path, and is likely to represent, for example, the leading edge of sheet document S or a feature such as a security thread. The next feature encountered, represented at 71, is only detected by channels $C_2$ to $C_5$. In each channel, the first peak represents the leading edge of a region of increased (or decreased) thickness, with the second peak indicating the end of the region. The occurrence of peaks in only four of the seven channels provides information as to the location and extent of the feature 71 perpendicular to the direction of travel. Similarly, feature 72 represented by peaks corresponding to its leading and trailing edges in channels $C_5$ and $C_6$ is indicative of a further region of increased (or decreased) thickness.

As illustrated by the dotted lines, it can be inferred that in this example, the features 70, 71 and 72 correspond to the security thread, tape and hologram of the banknote shown in FIG. 2. The location and extent of such features can thus be used as the basis for decisions as to whether the document is genuine and/or fit for reissue.

The map shown in FIG. 19 also corresponds to the FIG. 2 document, but here the output signals have been integrated. The degree of shading is thus representative of an actual thickness or change in thickness. As such, the locations, extent and thickness of the features 70', 71' and 72' are easily conveyed.

Maps such as those shown in FIGS. 18 and 19 can be output to an operator via a monitor or printer, or could be compared with predetermined maps for one or more known document types, stored in a suitable memory. This can be used, for example, as part of an authentication or denomination process.

The invention claimed is:

1. A two dimensional banknote thickness detection assembly, for detecting the thickness of a banknote on a document transport path, the assembly comprising a plurality of banknote thickness detection apparatuses, each apparatus comprising:
   a first detector unit having a sheet document contact point adjacent the document transport path, the detector unit comprising a piezoelectric element, a first portion of the piezoelectric element being fixed relative to the document transport path, and the piezoelectric element being arranged such that contact between a banknote and the sheet document contact point as a banknote passes the detector unit along the document transport path causes flexing of a second portion of the piezoelectric element relative to its first portion; and
   a sensing circuit connected to the piezoelectric element for outputting an electric signal based on a charge generated by the piezoelectric element upon flexing, the outputted signal being related to the thickness of the banknote;
   wherein the respective sheet document contact points of each apparatus are spaced laterally from one another in a direction substantially perpendicular to the direction of passage of the banknote, such that the outputted signal from each respective sensing circuit relates to the thickness of corresponding laterally spaced regions of the banknote;
   the assembly further comprising a processor adapted to generate a two dimensional spatial map of the thickness of at least a portion of the banknote, based on at least some of the outputted signals, the relative positions of the corresponding detector units and knowledge of the speed at which the banknote passes between the reference surface and the detector unit.

2. An assembly according to claim 1, wherein the sheet document contact point is provided by the second portion of the piezoelectric element, the second portion of the piezoelectric element being arranged to be directly contacted by a banknote in use.

3. An assembly according to claim 1, wherein the first detector unit further comprises an intermediary assembly having a contact surface which is movably mounted relative to the document transport path and which is arranged to be contacted by a banknote in use so as to provide the sheet document contact point, the intermediary assembly being adapted to impart movement of the contact surface to the second portion of the piezoelectric element.

4. An assembly according to claim 1 wherein the first detector unit is adapted to urge the sheet document contact point towards the document transport path.

5. A sheet thickness detection apparatus according to claim 1, wherein the detector unit opposes a fixed reference surface of the document transport path, banknotes conveyed in use between the fixed reference surface and the sheet document contact point causing flexing of the piezoelectric element.

6. An assembly according to claim 1, wherein each apparatus further comprises a second detector unit, the second detector unit being arranged on the opposite side of the document transport path from the first such that the sheet document contact point of the first detector unit opposes the sheet document contact point of the second detector unit, the document transport path passing therebetween, and the sensing circuit being additionally connected to the piezoelectric element of the second detector unit to thereby output one or more electric signals based on charges generated by one or more of the first and second piezoelectric elements.

7. An assembly according to claim 6, wherein the first and second piezoelectric elements are arranged to flex in opposite directions upon passage of a banknote, and the sensing circuit is adapted to sum the electric signals generated by the piezoelectric element of the first detector unit and the piezoelectric element of the second detector unit.

8. An assembly according to claim 1, wherein the piezoelectric element is planar, having a thickness dimension substantially less than at least one of its lateral dimensions.

9. An assembly according to claim 1, wherein the piezoelectric element comprises at least one of a polymeric piezoelectric material or a ceramic piezoelectric material.

10. An assembly according to claim 1, wherein the sensing circuit further comprises an integrator adapted to integrate the signal generated by the piezoelectric element over time, such that the signal outputted by the sensing circuit corresponds to a thickness of the banknote.

11. An assembly according to claim 10, wherein the integrator comprises an analogue integration circuit.

12. An assembly according to claim 10, wherein the integrator comprises an analogue to digital converter arranged to sample the signal generated by the piezoelectric element, and a processor adapted to compute the integral from the sampled signal.

13. An assembly according to claim 1, comprising a first array of banknote thickness detection apparatus extending across at least a portion of the document transport path in a direction substantially perpendicular to the direction of passage of the banknote.

14. An assembly according to claim 13, further comprising a second array of banknote thickness detection apparatus spaced from the first array in the direction of document transport and extending across at least a portion of the width of the document transport path in a direction substantially perpendicular to the direction of passage of the banknote, the second array being offset from the first array in the direction substantially perpendicular to the direction of passage of the banknote.

15. An assembly according to claim 14, wherein the first and second arrays of banknote thickness detection apparatus each extend over less than the full width of the document transport path, and the assembly further comprises first and second document transport modules disposed in line with the respective array.

16. An assembly according to claim 1 further comprising a processor adapted to compare the output signal or generated two dimensional spatial map with at least one predetermined signal profile or map corresponding to a known banknote, to thereby determine a level of similarity between the detected banknote and the known banknote.

17. A banknote handling apparatus comprising an input module for feeding banknotes into the apparatus, a document transport assembly for conveying banknotes along a document transport path from the input module to an output module, and a two dimensional banknote thickness detection assembly according to claim 1 arranged to detect the thickness of banknotes on the document transport path.

18. A method for detecting the thickness of a banknote on a document transport path, comprising:
  conveying a banknote along the document transport path past a past a plurality of first detector units, each first detector unit having a sheet document contact point adjacent the document transport path, the detector unit comprising a piezoelectric element, a first portion of the piezoelectric element being fixed relative to the document transport path, contact between the banknote and the sheet document contact point causing flexing of a second portion of the piezoelectric element relative to its first portion, the plurality of first detection units being spaced laterally from one another;
  outputting via respective sensing circuits electric signals based on the charges generated by the piezoelectric elements upon flexing, the outputted signals being related to the thickness of corresponding laterally spaced regions of the banknote; and
  generating a two dimensional spatial map of the thickness of at least a portion of the banknote, based on at least some of the outputted signals, the relative positions of the corresponding detector units and knowledge of the speed at which the banknote passes between the reference surface and the detector unit.

19. A method according to claim 18, wherein the sheet document contact point is provided by the second portion of the piezoelectric element such that, on passing the detector unit, the banknote directly contacts the second portion of the piezoelectric element to cause flexing thereof.

20. A method according to claim 18, wherein the sheet document contact point is provided by a contact surface of an intermediary assembly provided in the at least one detector unit which is movably mounted relative to the document transport path such that, on passing the detector unit, the banknote causes movement of the contact surface which is imparted to the second portion of the piezoelectric element by the intermediary assembly.

21. A method according to claim 20, wherein movement of the contact surface is transmitted to the second region of the piezoelectric element by a movably mounted contact member disposed between the document transport path and the piezoelectric element, a first region of the contact member adjacent the document transport path providing the contact surface and a second region of the contact member contacting the second portion of the piezoelectric element.

22. A method according to claim 18, wherein a second detector unit is arranged on the opposite side of the document transport path from the first such that the sheet document contact point of the first detector unit opposes the sheet document contact point of the second detector unit, such that the banknote is conveyed along the document transport path between the first and second detector units, causing flexing of one or more of the first and second piezoelectric elements, the outputted electric signal being generated by at least one of the first or second piezoelectric elements.

23. A method according to claim 22, further comprising generating and outputting a sum of the electric signals based on the charges generated by the piezoelectric element of the first detector unit and the piezoelectric element of the second detector unit.

24. A method according to claim 18, further comprising integrating the signal generated by the or each piezoelectric element over time, such that the signal outputted by the sensing circuit corresponds to a thickness of the banknote.

25. A method according to claim 18, further comprising comparing the output signal or generated two dimensional spatial map with at least one predetermined signal profile or map corresponding to a known banknote, to thereby determine a level of similarity between the detected banknote and the known banknote.

* * * * *